(12) United States Patent
Hasuike et al.

(10) Patent No.: US 7,975,231 B2
(45) Date of Patent: Jul. 5, 2011

(54) IMAGE DISPLAY UPDATING SYSTEM, SERVER CLIENT SYSTEM AND DRAWING OPERATION ECHO BACK SCRIPT

(75) Inventors: Akira Hasuike, Tokyo (JP); Takanobu Kagawa, Tokyo (JP)

(73) Assignee: Sapience Corporation, Tokyo (JP)

( * ) Notice: Subject to any disclaimer, the term of this patent is extended or adjusted under 35 U.S.C. 154(b) by 0 days.

(21) Appl. No.: 12/449,685

(22) PCT Filed: Feb. 28, 2008

(86) PCT No.: PCT/JP2008/053486
§ 371 (c)(1),
(2), (4) Date: Aug. 20, 2009

(87) PCT Pub. No.: WO2008/120517
PCT Pub. Date: Oct. 9, 2008

(65) Prior Publication Data
US 2010/0083146 A1 Apr. 1, 2010

(30) Foreign Application Priority Data
Mar. 29, 2007 (JP) ................................. 2007-086855

(51) Int. Cl.
*G06F 3/00* (2006.01)
*G06F 3/048* (2006.01)
(52) U.S. Cl. ........ 715/760; 715/762; 715/764; 715/744; 715/211; 715/231
(58) Field of Classification Search .................. 715/760, 715/762, 764, 744, 746, 771, 748, 749, 200, 715/211, 231, 273
See application file for complete search history.

(56) References Cited

U.S. PATENT DOCUMENTS

| 6,249,787 B1 * | 6/2001 | Schleimer et al. ..................... 1/1 |
| 6,978,418 B1 * | 12/2005 | Bain et al. ...................... 715/205 |
| 2002/0032701 A1 * | 3/2002 | Gao et al. ...................... 707/513 |
| 2002/0109729 A1 * | 8/2002 | Dutta ............................. 345/790 |
| 2004/0207654 A1 * | 10/2004 | Hasuike ........................ 345/698 |
| 2005/0240869 A1 * | 10/2005 | Leetaru et al. ................ 715/530 |

FOREIGN PATENT DOCUMENTS

| JP | 2000-222324 A | 8/2000 |
| JP | 2001-273513 A | 10/2001 |
| JP | 2005-107662 A | 4/2005 |

OTHER PUBLICATIONS

PCT Search Report dated Apr. 8, 2008.
Ken'Ichi Nakagawa, Awareness Wshien Ni Motozuku Real Time Na WWW Collaboration Kankyo No Kochiku; Info. Processing Soc. of Japan Kenkyu Hokoku, Nov. 13, 1997; V. 97; No. 105; pp. 19-24.

* cited by examiner

*Primary Examiner* — Tadeese Hailu
(74) *Attorney, Agent, or Firm* — Hedman & Costigan, P.C.; James V. Costigan

(57) ABSTRACT

A drawing object image and an image processing program are provided in an HTTP server 12. The drawing object image is downloaded by accessing the HTTP server 12 from a terminal unit 10. When the operator initiates a drawing operation on a WEB browser screen of terminal unit 10, an XMLHTTP request with coordinate position information of the cursor and the drawing radius information are transmitted to the HTTP server 12 to execute an image manipulation process. The WEB browser virtually divides the drawing operation object image into cells, identifies the cells in which the image contents are modified in the image manipulation process, and issues HTTP requests for the cell images. The HTTP server 12 cuts out the manipulated image in the requested areas and transmits them to the WEB browser and arranges them.

29 Claims, 7 Drawing Sheets

FIG.2
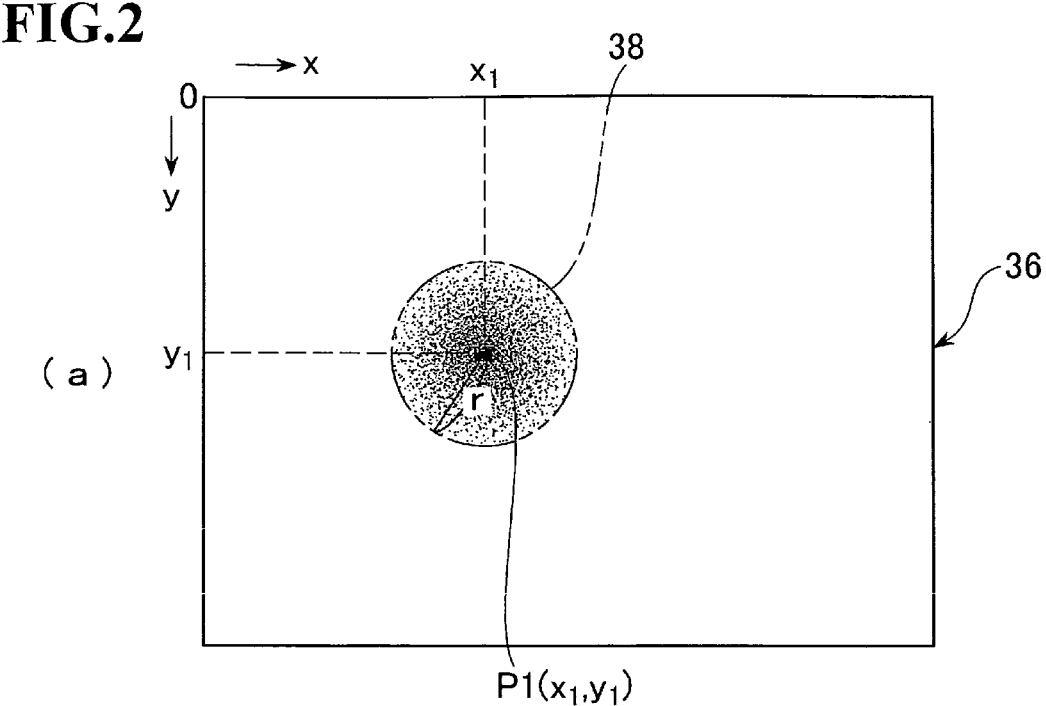
(a)
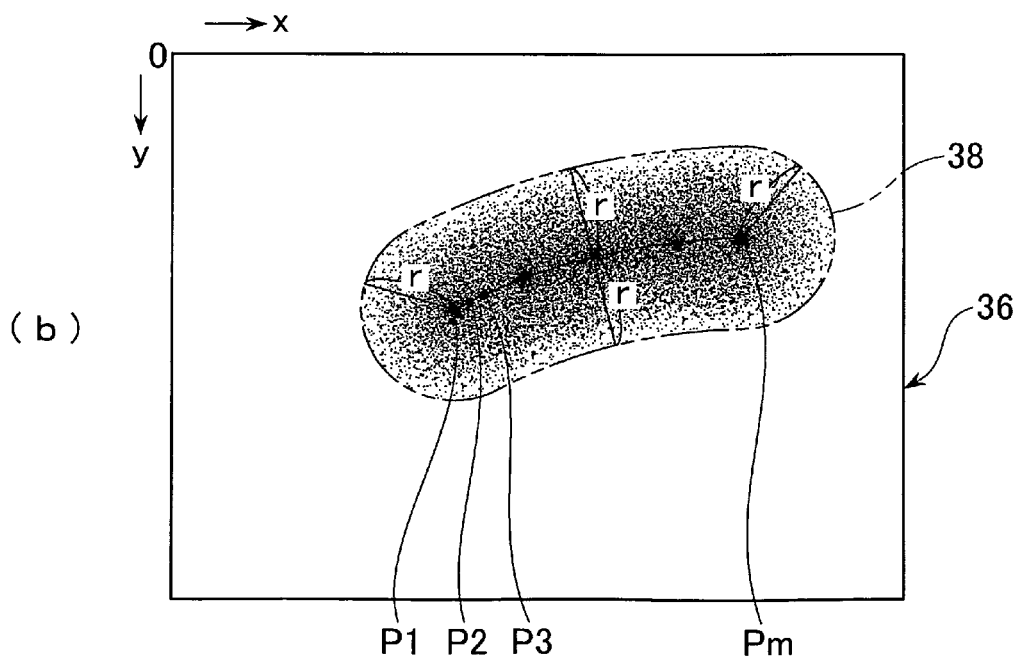
(b)

FIG.7
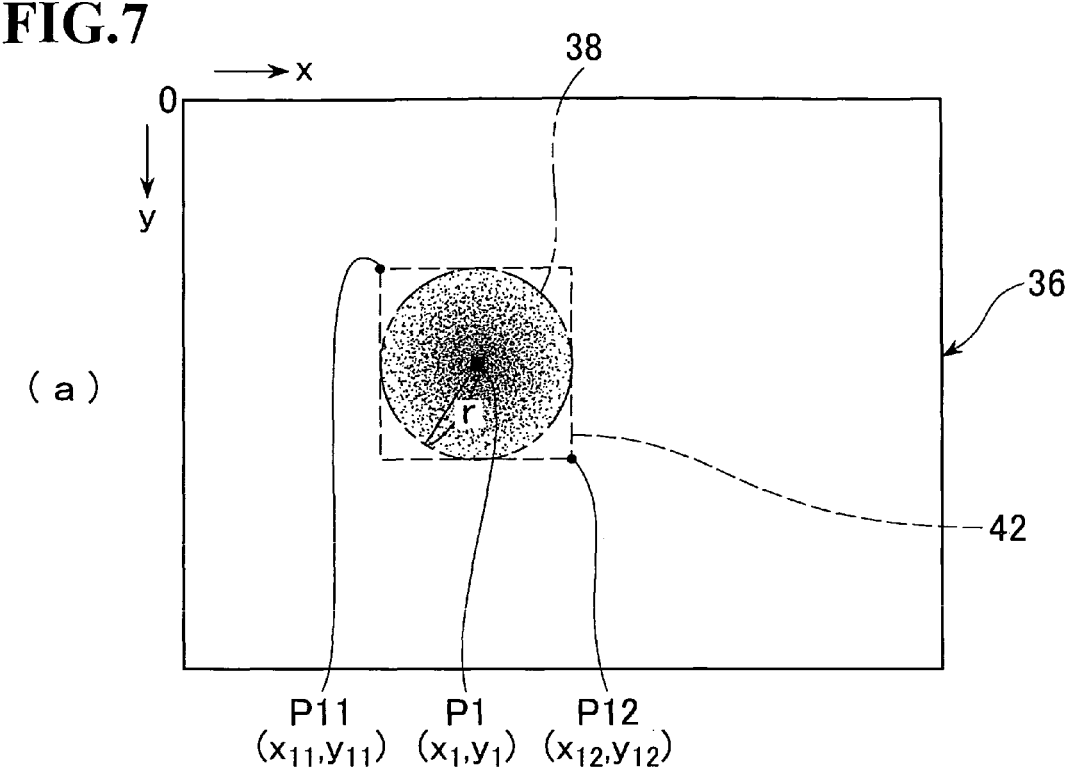
(a)
P11 P1 P12
$(x_{11}, y_{11})$ $(x_1, y_1)$ $(x_{12}, y_{12})$
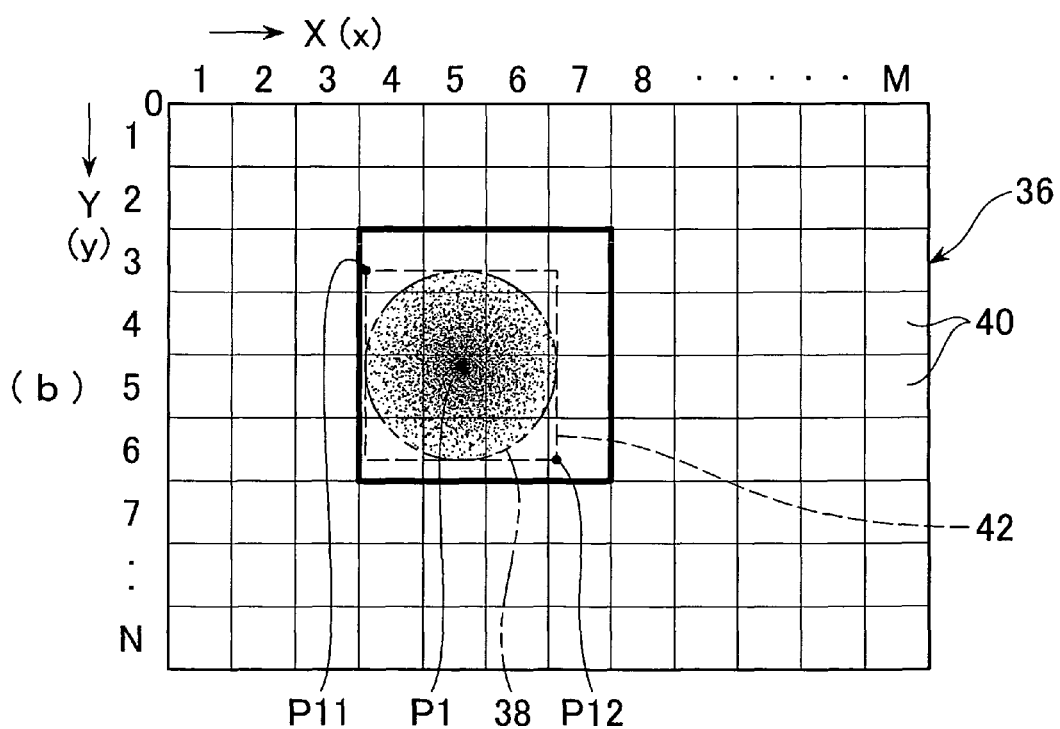
(b)
P11  P1  38  P12

IMAGE DISPLAY UPDATING SYSTEM, SERVER CLIENT SYSTEM AND DRAWING OPERATION ECHO BACK SCRIPT

TECHNICAL FIELD

The present invention relates to a method for manipulating an image stored on the server side by means of a brush tool having a density representation based on a drawing operation on a WEB browser screen of a terminal unit, in which the image manipulated in response to the drawing operation can be reflected to the WEB browser screen without a great delay from the drawing operation. Also, this invention relates to a method for manipulating an image stored on the server side by means of a brush tool having a density representation based on a drawing operation on a WEB browser screen of a terminal unit, in which the image manipulated moment by moment in response to a drawing operation can be reflected to the WEB browser screen without a great delay from the drawing operation, whereby the operator of the terminal unit can operate the drawing operation as desired.

BACKGROUND ART

An image sharing service using the Internet is emerging. The image sharing service is a service in which a terminal unit (client terminal) of a participator uploads an image such as photo, picture or graphics to the server that stores the image to allow the participators to share the stored image. In the image sharing service, the participator can arbitrarily manipulate the image stored in the server with an operation from his or her own terminal unit. This image manipulation function was conventionally realized by installing a dedicated image processing program such as a helper application program, ActiveX (registered trademark) program or JavaApplet program into the terminal unit. That is, the participator downloads an image to be manipulated from the server to the terminal unit, an image processing program of the terminal unit executes a manipulation process on the image based on a drawing operation at the terminal unit, in response to the drawing operation, and the participator uploads the image having undergone the manipulation process to the server to restore it. However, with this conventional method, it was required to install the dedicated image processing program into the terminal unit, thereby discouraging broad use.

As a method for implementing an image manipulation process on the image sharing service using the functions of the WEB browser without installing the dedicated image processing program into the terminal unit, it is conceivable that the image processing program is prepared on the server side, a drawing operation is operated from the terminal unit, and the corresponding image manipulation process is executed with the image processing program on the server side. That is, the participator downloads an image to be manipulated from the server to the terminal unit and makes a drawing operation on the browser screen of the terminal unit, on which the image is displayed; the terminal unit adds the information required to execute the image manipulation process on the server in response to the drawing operation to an HTTP request as a parameter of the HTTP request and issues the HTTP request for the image having undergone the image manipulation process; the server receives this HTTP request, controls the image processing program based on the information included as the parameter in the request to execute the corresponding image manipulation process, and returns the image having undergone the manipulation process as a response to the HTTP request; and the terminal unit receives the image having undergone the manipulation process and updates the original image displayed on the browser screen with the image having undergone the manipulation process.

By the way, in executing the image manipulation process, it is required that the manipulation process result is reflected, following the drawing operation (movement, etc. of the cursor), on the screen of the terminal unit where the drawing operation is operated (i.e., the display image is modified successively with the progress of the drawing operation, such as the line is drawn along the position which the cursor passes on the screen, etc.). Updating the display in this way is generally called an echo back. In the drawing operation, if the response of echo back is slow, the manipulation process result is not promptly reflected to the display image on the screen where the drawing operation is operated, whereby the drawing operation can not be operated as desired, and is less convenient in use.

The slow response of echo back is problematical, especially in the drawing operation for modifying the image by means of the brush tool having a density representation. Herein, the "brush tool having a density representation" means a drawing tool for realizing the drawing in which the drawing density is varied in accordance with a manner of drawing operation of the pointing device (moving speed for moving the cursor while holding the mouse button down, the time of pressing and holding the mouse button with the cursor placed at one position, etc.), which is called as a pen tool, a brush tool, a paintbrush tool, or an air brush tool, for example. For example, the air brush tool produces the effect of spraying the ink, in which an ink spray image is drawn like a circle with predetermined largeness at the position of the mouse cursor by pressing the mouse button. The density distribution may be set such that the nearer to the center of the circle in operating the drawing, the higher the density is. And the drawing density can be gradually higher, depending on the time of pressing and holding the mouse button down at one position. Also, when moving the cursor while holding the mouse button down, the drawing is thinner if the moving speed is faster, or the drawing is denser if the moving speed is slower. Accordingly, if the manipulation process result (the image manipulated by the air brush) through the drawing operation of the air brush is not reflected promptly on the screen where the drawing operation is operated, the operator can not know how long the mouse button should continue being pressed, or how fast the mouse cursor has to be moved, and can not operate the drawing as desired. Accordingly, the faster response of the echo back is particularly important in the drawing operation for modifying the image by means of the brush tool having a density representation.

DISCLOSURE OF THE INVENTION

Problems to be Solved by the Invention

The response of the echo back has some influence on the operability of the drawing operation, as described above. According to the conventional method for executing the image manipulation process by installing the dedicated image processing program into the terminal unit, it is easy to make the response of the echo back faster, whereby the manipulation process result can be reflected promptly to the screen, following the drawing operation on the screen without problem. On the contrary, if the manipulation process is executed using the image processing program on the server side, the drawing operation is operated on the browser screen of the terminal unit and the corresponding image manipulation process is executed on the server, whereby the manipulation process result is reflected to the browser screen of the terminal unit through the communication between the terminal unit and the server, so that the response of the echo back is inevitably slower. As a result, according to the latter method, it is expected that the usability is worse especially in the drawing operation for modifying the image by means of the brush tool having a density representation.

In the method for executing the image manipulation process using the image processing program on the server side, to make the response of the echo back faster, the entire image display on the browser screen is not updated by transmitting all the manipulated image from the server, but a process for transmitting only a manipulated area of the entire image from the server and updating the corresponding area on the browser screen is required. However, in operating the drawing operation at the terminal unit, if the terminal unit computes the area to be manipulated with the drawing operation, appends the information required for executing the image manipulation process in response to the drawing operation as the parameter, and issues an HTTP request for the image in the area where the image manipulation process is executed among the entire image, the terminal unit transmits the information required to execute the image manipulation process to the server after computing the area to be manipulated, so that the manipulation start time on the server is delayed by the time required for the computation, making the response of the echo back slower.

This invention has been achieved in the light of the above-mentioned problems, and it is an object of the invention to provide a method for manipulating an image stored on the server side by means of a brush tool having a density representation based on a drawing operation on a WEB browser screen of a terminal unit, in which the image manipulated in response to the drawing operation is reflected to the WEB browser screen without a great delay from the drawing operation. Also, it is another object of this invention to provide a method for manipulating an image stored on the server side by means of a brush tool having a density representation based on a drawing operation on a WEB browser screen of a terminal unit, in which the image manipulated moment by moment in response to the drawing operation is reflected to the WEB browser screen without a great delay from the drawing operation, whereby the operator of the terminal unit can operate the drawing operation as desired.

Means for Solving the Problems

The present invention provides an image display updating method for displaying an image on a screen of a WEB browser installed into a terminal unit, in which the operator of the terminal unit operates a drawing operation using a pointing device on the screen to modify the display of the image at a cursor position by the pointing device by means of a brush tool having a density representation, wherein a server holds and manages data of the image that becomes a drawing operation object for the operator and an image processing program that executes an image manipulation process on the image data in response to the drawing operation, the terminal unit and the server are set in a state mutually communicable via a network, when the WEB browser of the terminal unit makes an HTTP request for an HTML document to the server, the server returns to the terminal unit the HTML document in which a drawing operation echo back script interpretable by the WEB browser is described inside or the HTML document in which reading the drawing operation echo back script as an external file is described as a response to the HTTP request, and the WEB browser of the terminal unit receives the HTML document and appends the drawing operation echo back script to the WEB browser, the HTML document, as a pre-processing, makes an HTTP request for the drawing operation object image held and managed by the server to the server and displays an image based on the image data received as a reply on the screen of the WEB browser, the drawing operation echo back scrip appended to the WEB browser of the terminal unit transmits an XMLHTTP request with the coordinate information of the cursor position according to the drawing operation to the server, when the drawing operation is operated on the screen where the image is displayed, the image processing program of the server executes the image manipulation process on the drawing operation object image held and managed by itself by means of the brush tool having the density representation, based on the received coordinate information of the cursor position and the information on the drawing size of the brush acquired additionally or held from the beginning, the drawing operation echo back script, after transmitting the coordinate information of the cursor position, acquires the information of one or more rectangular areas including an area where the image contents are modified in the image manipulation process among a plurality of rectangular areas into which the image displayed on the screen of the WEB browser is divided and transmits one or more HTTP requests for selectively requesting the images in the one or more rectangular areas to the server, the server receives the one or more HTTP requests, and selectively returns the image data of the corresponding one or more rectangular areas in the image displayed on the screen of the WEB browser, where the image manipulation process is completed, and the WEB browser displays the images of the received image data of one or more rectangular areas in the corresponding rectangular areas on the screen of the WEB browser, instead of the images being displayed so far in the rectangular areas.

In this invention, the "WEB browser" means the software for perusing a WEB page such as Internet Explore (trademark) by Microsoft Corporation, explicitly called the "WEB browser" or not called the "WEB browser" even though it has a function of perusing the WEB page. Accordingly, it is natural that the request corresponding to the "HTTP request" and the "XMLHTTP request" in the Internet Explore may be possibly given another name according to the WEB browser (software for perusing the WEB page). Accordingly, it is natural that the "HTTP request" or the "XMLHTTP request" in this invention is not limited to the request simply called the "HTTP request" or "XMLHTTP request", but includes the request corresponding to the request actually called the "HTTP request" or "XMLHTTP request" but given another name depending on the WEB browser (software for perusing the WEB page).

According to this invention, since the images of one or more rectangular areas including an area where the image contents are modified in the image manipulation process based on the drawing operation among a plurality of rectangular areas into which the image displayed on the screen of the WEB browser is divided are selectively transmitted from the server to the WEB browser to update the screen display of the WEB browser, it is possible to shorten the time taken to download the updated image as compared with the case of transmitting the image data of the entire image displayed on the screen of the WEB browser from the server to the WEB browser to update the display of the entire image displayed on the screen of the WEB browser. On the contrary, with this method, it takes the time for computing the area where the image contents are modified as compared with the case of updating the display of the entire image displayed on the screen of the WEB browser. Thus, in this invention, when the drawing operation is operated on the screen where the image is displayed, the drawing operation echo back script transmits an XMLHTTP request with the coordinate information of the cursor position in response to the drawing operation to the server additionally (the HTTP request for the image subjected to manipulation process is not transmitted at this time, but transmitted later additionally. The computation of the area where the image contents are modified in the image manipulation process can be made on the terminal unit side or server side after the coordinate information of the cursor position is transmitted to the server). Accordingly, the image processing program of the server can start the image manipulation process in response to the drawing operation immediately from the drawing operation. Accordingly, when the drawing operation is operated, it is possible to shorten the time from the start of the drawing operation to the end of the image manipulation process as compared with the case of transmitting the information required to execute the image manipulation process to the server after computing the area to be manipulated. Thereby, if the drawing operation echo back script transmits the HTTP request for the image subjected to manipulation process after transmitting the XMLHTTP request, it is possible to acquire the corresponding image subjected to manipulation process in a shorter wait time.

Also, the invention provides an image display updating method for displaying an image on a screen of a WEB browser installed into a terminal unit, in which the operator of the terminal unit operates a drawing operation using a pointing device on the screen to modify the display of the image at a cursor position by the pointing device by means of a brush tool having a density representation, wherein a server holds and manages data of the image that becomes a drawing operation object for the operator and an image processing program that executes an image manipulation process on the image data in response to the drawing operation, the terminal unit and the server are set in a state mutually communicable via a network, when the WEB browser of the terminal unit makes an HTTP request for an HTML document to the server, the server returns, to the terminal unit, the HTML document in which a drawing operation echo back script interpretable by the WEB browser is described inside or the HTML document in which reading the drawing operation echo back script as an external file is described as a response to the HTTP request, and the WEB browser of the terminal unit receives the HTML document and appends the drawing operation echo back script to the WEB browser, the HTML document, as a pre-processing, makes an HTTP request to the server for the drawing operation object image held and managed by the server and displays an image based on the image data received as a reply on the screen of the WEB browser, the drawing operation echo back scrip appended to the WEB browser of the terminal unit transmits an XMLHTTP request with the coordinate information of the cursor position according to the drawing operation to the server, when the drawing operation is operated on the screen where the image is displayed, the image processing program of the server executes the image manipulation process on the drawing operation object image held and managed by itself by means of the brush tool having the density representation, based on the received coordinate information of the cursor position and the information on the drawing size of the brush acquired additionally or held from the beginning, the drawing operation echo back script, after transmitting the coordinate information of the cursor position, acquires the information of one or more rectangular areas including an area where the image contents are modified in the image manipulation process among a plurality of rectangular areas into which the image displayed on the screen of the WEB browser is divided and transmits one or more HTTP requests for selectively requesting the images in the one or more rectangular areas to the server, the server receives the one or more HTTP requests, and selectively returns the image data of the corresponding one or more rectangular areas in the image displayed on the screen of the WEB browser, where the image manipulation process is completed, the WEB browser displays the images of the received image data of one or more rectangular areas in the corresponding rectangular areas on the screen of the WEB browser, instead of the images being displayed so far in the rectangular areas, the WEB browser transmits the coordinate information of the cursor position with the XMLHTTP requests successively, after receiving a response to the previous XMLHTTP request, without waiting for the images subjected to manipulation process based on the coordinate information of the cursor position transmitted with the former XMLHTTP requests to be displayed on the screen of the WEB browser, and the image processing program of the server further repeats the image manipulation process for the images having undergone the image manipulation process based on the XMLHTTP request.

According to this invention, in addition to the above advantages, the image manipulated moment by moment in response to a drawing operation can be reflected to the WEB browser screen without a great delay from the drawing operation, whereby the operator of the terminal unit can operate the drawing operation as desired using the brush tool having a density representation. In addition, the drawing operation echo back script transmits the coordinate information of the cursor position with the XMLHTTP requests successively, without waiting for the images subjected to manipulation process based on the coordinate information of the cursor position transmitted with the former XMLHTTP requests to be displayed on the screen of the WEB browser. Therefore, the image processing program of the server can operate the image manipulation process following the drawing operation. This also contributes to the fact that the image manipulated moment by moment in response to a drawing operation can be reflected to the WEB browser screen without a great delay from the drawing operation.

In the image display updating method of this invention, the drawing operation echo back script may compute by itself and acquire the information of one or more rectangular areas including the area where the image contents are modified in the image manipulation process. Also, the drawing operation echo back script may acquire the information of one or more rectangular areas including the area where the image contents are modified in the image manipulation process by receiving the computation result of the image processing program in the server.

In the image display updating method of this invention, the drawing operation echo back script may transmit the information on the drawing size of the brush to the server simultaneously with the coordinate information of the cursor position. Also, the drawing operation echo back script may transmit the information on the drawing size of the brush to the server when the operator operates a setting operation of the drawing size of the brush.

In the image display updating method of this invention, the image processing program of the server may execute the image manipulation process, based on the coordinate information of the cursor position received from the terminal unit and the information on the drawing size of the brush received simultaneously with the coordinate information of the cursor position from the terminal unit or held by the server before receiving the coordinate information of the cursor position, and return the coordinate information of a drawing center position of the brush to be drawn or having been drawn through the image drawing process as a response to the XMLHTTP request to the WEB browser of the terminal unit, and then the drawing operation echo back script may compute by itself and acquire the information of one or more rectangular areas including the area where the image contents are modified in the image manipulation process, using the coordinate information of the drawing center position of the brush received from the server and the information on the drawing size of the brush received simultaneously with the coordinate information of the drawing center position of the brush from the server or held by the drawing operation echo back script before receiving the coordinate information of the drawing center position of the brush. In this case, the coordinate information of the drawing center position of the brush may be the coordinate information of the cursor position itself or the coordinate information obtained by interpolating between/among the coordinates of the cursor position using the information of the coordinates of the cursor position.

In the image display updating method of this invention, the drawing operation echo back script may compute by itself and acquire the information of one or more rectangular areas including the area where the image contents are modified in the image manipulation process, using the coordinate information of the cursor position acquired not by the server but by itself, and the information on the drawing size of the brush held by the drawing operation echo back script before acquiring the coordinate information of the cursor position.

Further, in the image display updating method of this invention, the image on the screen of one terminal unit can reflect the image manipulated by the drawing operation from another terminal unit. That is, when a drawing operation is operated for the drawing operation object image simultaneously from another terminal unit, the image processing program may also execute the image manipulation process based on the drawing operation, the drawing operation echo back script periodically issues the XMLHTTP request with a timer drive, the image processing program returns the information of one or more rectangular areas including the area where the image contents are modified, which are computed by the image processing program, or the information required when the drawing operation echo back script computes the rectangular areas, as a response to the XMLHTTP request, in response to the image manipulation process based on the drawing operation from another terminal unit, the drawing operation echo back script transmits one or more HTTP requests for selectively requesting the images in one or more rectangular areas according to the information received and acquired from the server, or one or more rectangular areas according to the information computed by itself and acquired based on the information received from the server to the server, the server receives the HTTP request, and returns selectively the image data in the corresponding one or more rectangular areas of the image displayed on the screen of the WEB browser, and the WEB browser displays the images of the received image data of one or more rectangular areas in the corresponding rectangular areas on the screen of the WEB browser, instead of the images being displayed so far in the rectangular areas.

In the image display updating method of this invention, the drawing operation object image held and managed by the server may be composed of a single image file corresponding to the entire image, or a plurality of image files corresponding to a plurality of sliced images in which the entire image is actually divided into rectangles, and the rectangular area may be the area of the virtual split image unit in which the image in one image file is virtually divided into plural rectangles. Also, the drawing operation object image held and managed by the server may be composed of image files of a plurality of sliced images in which the entire image is actually divided into rectangles, and the rectangular area may accord with the area of the sliced-image unit.

In the image display updating method of this invention, the drawing operation echo back script of the terminal unit may arrange and display the received image of one or more rectangular areas in the corresponding area of the WEB browser in front of the image being displayed so far in the corresponding area by changing the z-index.

In the image display updating method of this invention, the drawing operation echo back script of the terminal unit may transmit, for each XMLHTTP request, the information on a plurality of coordinate positions of the cursor position along a movement locus of the cursor with the drawing operation to the server, acquire the information of one or more rectangular areas including the area where the image contents are modified through the entire image manipulation process based on the plurality of coordinate positions, and transmit one or more HTTP requests for selectively requesting the images in the one or more rectangular areas to the server, when the drawing operation is operated on the screen where the image is displayed.

In the image display updating method of this invention, the manner of the drawing operation of the pointing device may be the moving speed of the pointing device, or the button-press duration of the pointing device, etc.

A server client system of this invention performs the image display updating method of this invention. The drawing operation echo back script of this invention is the program run on the terminal unit to execute the process on the terminal unit for implementing the image display updating method of this invention, in which the program is transmitted from the server and appended to the WEB browser of the terminal unit.

BRIEF-DESCRIPTION OF THE DRAWINGS

FIG. 2(*a* & *b*) is a view showing a state where a brush tool is used to draw on a canvas, or in a drawing operation object image, in the system configuration of FIG. 1;

FIG. 7 (*a* & *b*) is a view showing a different example of the range of cell images from that in FIG. 3, of which the image displays are updated in the same drawing state as in FIG. 2*a*.

DESCRIPTION OF SYMBOLS

Figure 1:
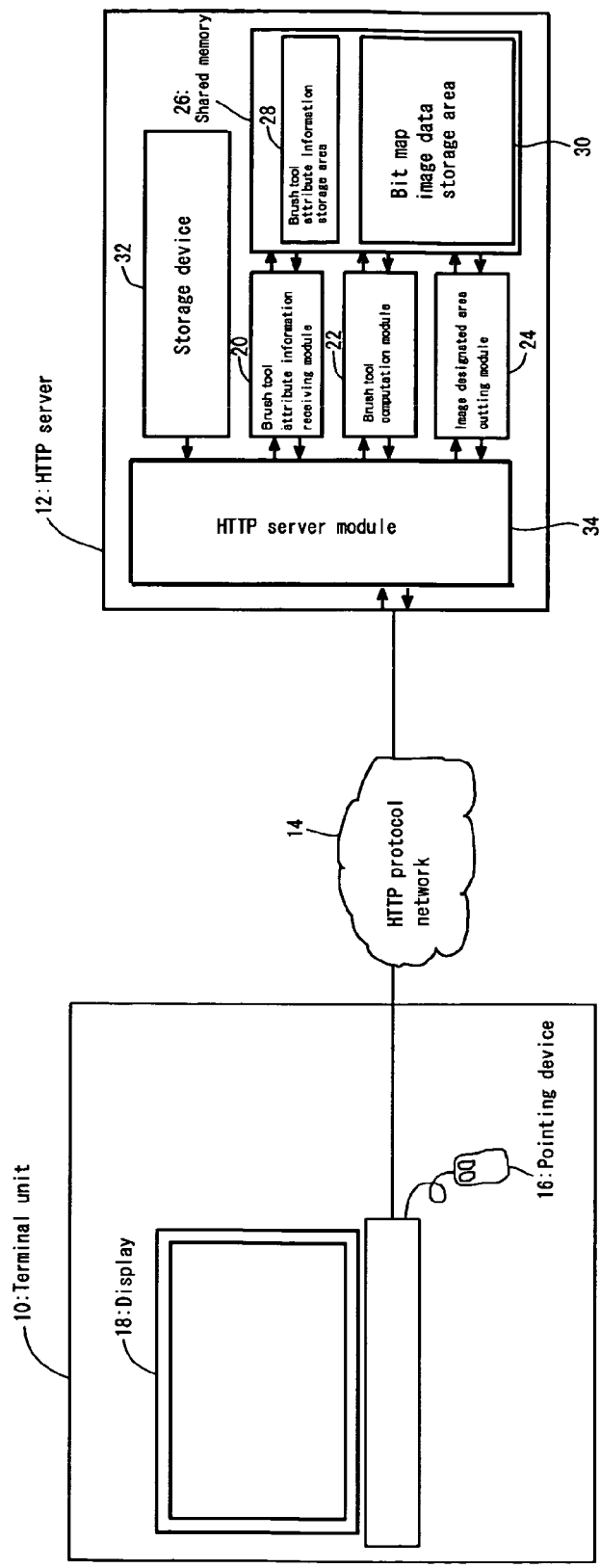
FIG. 1 is a block diagram showing a system configuration according to an embodiment of the present invention.

10 terminal unit
16 pointing device
12 HTTP server
14 HTTP protocol network
36 canvas for configuring the entire drawing operation object image 38 image with brush tool
40 cell
P1, P2, . . . , Pm position of mouse cursor

BEST MODE FOR CARRYING OUT THE INVENTION

Embodiment 1

An embodiment of this invention will be described below. FIG. 1 shows a system configuration. This system is configured as a server client system in which a terminal unit (HTTP client) 10 and an HTTP server 12 are mutually connected via an HTTP protocol network 14 such as the Internet. The terminal unit 10 includes a pointing device 16 such as a mouse or tablet and a display 18. Herein, the mouse is used as the pointing device 16. Also, the terminal unit 10 has installed a general WEB browser such as Internet Explorer capable of interpreting a script language in conformance to the ECMA-Script standards, including JAVASCRIPT (registered trademark). In this embodiment, JAVASCRIPT is used as the script language.

The HTTP server 12 has installed an image processing program. This image processing program, like the typical paint software or image edit (retouch) software, can create anew image and manipulate a created image, using various drawing tools (brush tool having a density representation, pencil, straight line, curve, paint out, eraser and so on). Herein, description will be made to the case where a created image is used as the drawing operation object image, and the drawing operation object image is manipulated, using the brush tool having a density representation (hereinafter simply referred to as the "brush tool"). According to the image processing program in this embodiment, the operator of the terminal unit 10 can designate the following drawing attributes for the brush tool.

(a) Color of brush (for each red, green, and blue)
(b) Master density of brush
(c) Cross-sectional shape (drawing shape) of brush such as a circle or ellipse
(d) density distribution pattern of brush (kind of brush)
(e) Drawing size of brush
(f) Presence or absence of interpolation The brush tool having a density representation is selected by designating the density distribution pattern of the brush tool having a density representation in the designation of the density distribution pattern of brush at (d). Also, the density of each part of the brush to be drawn is determined by "the master density designated at (b) multiplied by the density distribution pattern designated at (d)". In this embodiment, the drawing is made in which the drawing shape of the brush is circular and such a density distribution pattern that the nearer to the center of circle, the higher the density is. When the circular shape of the brush is designated, the designation of drawing size corresponds to the designation of the drawing radius or drawing diameter (drawing radius in this embodiment) of the brush.

In the HTTP server 12, a brush tool attribute information receiving module 20, a brush tool computation module 22, and an image designation area cutting module 24, etc. are provided beforehand by the image processing program. Also, a brush tool attribute information storage area 28 and a storage area 30 for bit map image data of manipulation object (drawing operation object image) are provided beforehand in a shared memory 26 of the HTTP server 12. The HTTP server 12 offering a service for an HTTP request from the WEB browser is inherently independent for each request, and usually does not share the memory. However, to realize an echo back of the drawing operation on the WEB browser, the HTTP server 12 shares the shared memory 26 among the services. The HTTP server 12 is totally composed of one server, or may be organized by a plurality of servers by distributing the functions.

The brush attribute information receiving module 20 receives the attribute information (color, master density, cross-sectional shape, density distribution pattern, and presence or absence of interpolation in this embodiment) of the brush tool transmitted in advance from the terminal unit 10, and stores it in the brush tool attribute information storage area 28 of the shared memory 26. In this embodiment, the information of drawing size (drawing radius) among the attributes of the brush set by the operator is transmitted together with the coordinate information of cursor position from the terminal unit 10 to the HTTP server 12, when the drawing operation is actually made. The brush tool computation module 22 acquires the attribute information (color, master density, cross-sectional shape, density distribution pattern, and presence or absence of interpolation) of the brush tool stored in the brush tool attribute information storage area 28, receives the coordinate information of the brush tool and the information of drawing size (drawing radius) from the terminal unit 10, and executes a process (image manipulation process) of modifying the image while computing the density to the image data in the bit map image data storage area 30 of the shared memory 26, when the drawing operation is operated at the terminal unit 10.

This density computation is made by adding the pixel value according to the image data multiplied by $1-\alpha$ ($\alpha$ is an appropriate factor, $0<\alpha<1$) and the pixel value according to the brush tool multiplied by $\alpha$ for each pixel within the area (drawing diameter) for modifying the image data through the drawing operation by means of the brush tool, for example. As a result, each pixel within the area is manipulated into the pixel of mixing the background image (original image) and the image by means of the brush, producing the image in a translucent state where the background image is seen through in the back of the image by means of the brush. This density computation is successively repeated for the previous manipulation result, every time the detection coordinate of the brush tool is changed due to the onMouseMove event, during the drawing operation. As a result, if the manipulation to the same pixel is repeated, the pixel is gradually more influenced by the brush (as the number of manipulations is greater), and the influence of the background image is accordingly weaker. Herein, as to the detection coordinate of the brush tool with the onMouseMove event, the distance from the previous detection coordinate to this detection coordinate is shorter as the moving speed of the mouse cursor is slower and longer as the moving speed is faster, whereby the number of manipulations repeated upon a certain pixel while the drawing diameter of the brush passes through the pixel is greater as the moving speed of the mouse cursor is slower and smaller as the moving speed is faster. Accordingly, as the moving speed of the mouse cursor is slower, the brush is drawn denser, whereas as the moving speed is faster, the brush is drawn thinner. In this manner, the drawing representation by means of the brush having a density representation is realized.

The above density computation may be executed at every fixed time with a timer event (setInterval or setTimeout) instead of being executed at every time the detection coordinate of the brush tool is changed with the onMouseMove event. In the case where setInterval is used as the timer event, once setInterval is set, a set function of density computation is called repeatedly at every fixed time, once set up. On the contrary, in the case where setTimeout is used, the function of density computation is called only once after a certain time, whereby the function is repeatedly called by setting setTimeout again in the called function. In the case where the timer event is used, like the case where the onMouseMove event is used, as the moving speed of the mouse cursor is slower, the time for the drawing diameter of the brush to pass through a certain pixel is longer, and the number of manipulations is greater, so that the brush is drawn denser. On the contrary, when the moving speed of the mouse cursor is faster, the time for the drawing diameter of the brush to pass through a certain pixel is shorter, and the number of manipulations is smaller, so that the brush is drawn thinner.

The drawing representation by means of the brush having a density representation may be implemented by other methods than the above density computation. For example, the pixels at sporadic positions in the background image (original image) within the drawing diameter of the brush are replaced with the pixels by means of the brush, whereby the image can be obtained in the translucent state where the background image is seen through in the back of the image by means of the brush to the human's eyes (i.e., macroscopically). And while the drawing operation is being operated, the replacement positions of the pixels are increased successively every time the detection coordinate of the brush tool is changed due to the onMouseMove event within the drawing diameter of the brush, whereby the influence of the brush is increasingly greater, and the influence of the background image is accordingly weaker. Herein, as to the detection coordinate of the brush tool due to the onMouseMove event, since the distance from the previous detection coordinate to this detection coordinate is shorter when the moving speed of the mouse cursor is slower, and the distance from the previous detection coordinate to this detection coordinate is longer as the moving speed is faster, the number of replacing the pixels per unit area in the area where the drawing diameter of the brush passes changes along with the moving speed of the mouse cursor. That is, the number of replacements is larger when the moving speed of the mouse cursor is slower, and smaller as the moving speed is faster. Accordingly, when the moving speed of the mouse cursor is slower, the brush is drawn denser, while when the moving speed is faster, the brush is drawn thinner. In this manner, the drawing representation by means of the brush having a density representation is realized.

The above replacement of pixel may be made at every fixed time measured on a timer event, instead of every time the detection coordinate of the brush tool is changed with the onMouseMove event. Thereby, the number of replacing the pixels per unit area in the area where the drawing diameter of the brush passes is larger when the moving speed of the mouse cursor is slower, and smaller as the moving speed is faster. Accordingly, when the moving speed of the mouse cursor is slower, the brush is drawn denser, whereas when the moving speed is faster, the brush is drawn thinner.

An HTML document to be firstly read when there is access from the terminal unit 10 is stored in a storage device 32 of the HTTP server 12. This HTML document includes a drawing operation echo back script described in JAVASCRIPT, which is executable by the WEB browser of the terminal unit 10. The methods for interpreting the drawing operation echo back script included in the HTML document include a method (method with internal description) for collectively reading and interpreting the drawing operation echo back script directly described in the HTML document, and a method (method with external file) for reading the drawing operation echo back script part from the HTTP server 12 while interpreting the HTML document, assembling the entire script, and interpreting it. An HTTP server module 34 communicates with the terminal unit 10 in accordance with an HTTP protocol.

The image drawn by the brush tool in the system configuration of FIG. 1 will be described below. FIG. 2 *a* & *b* shows a state where the drawing is made by means of the brush tool on a canvas 36 composing the overall drawing operation object image. On the display 18 of the terminal unit 10, all of the canvas 36 (in the case where the canvas 36 or the overall drawing operation object image is contained in the display area of the display 18) or a part of the canvas 36 (in the case where the canvas 36 or the overall drawing operation object image is not contained in the display area of the display 18) is displayed. In the case where a part of the canvas 36 is displayed, the operator can display any image area by shifting the display area through a scroll operation. Now, if the operator places the mouse cursor at any position P1 ($x_1, y_1$) with an origin O at, for example, the upper left corner on the canvas 36 as shown in FIG. 2*a*, and presses the mouse button down on the screen of the display 18 where the drawing operation object image is displayed, an image 38 by means of the brush tool is drawn in a circle with radius r centered at the mouse cursor position P1 ($x_1, y_1$). Herein, the density distribution is set such that the nearer to the center of the circle, the higher the density is. When the mouse cursor is moved with the mouse button held down, the continuous image 38 (curve image having the thickness 2r) by means of the brush tool is drawn, following the mouse-cursor-movement locus P1, P2, . . . , Pm, as shown in FIG. 2*b*. At this time, the drawing density of the image 38 varies according to the moving speed of the mouse cursor. That is, if the moving speed of the mouse cursor is faster, the image is drawn thinner, or if the moving speed is slower, the image is drawn denser.

Figure 3:
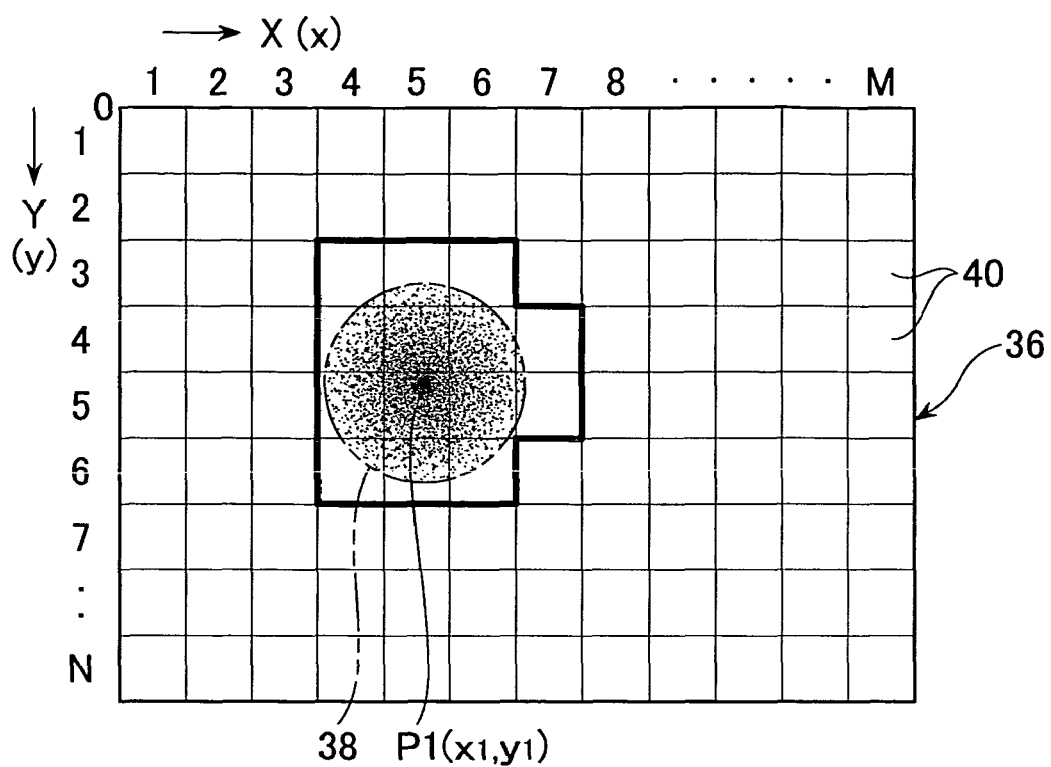
FIG. 3 is a view showing one example in which the canvas is virtually divided into rectangles (cells) and the range of cell images in which the image display is updated corresponding to the drawing state of FIG. 2*a*.

An image manipulation process to make the drawing of FIG. 2 *a* & *b* is implemented by the brush tool computation module 22 of the HTTP server 12. And the image manipulated moment by moment through this image manipulation process is displayed as echo back on the display 18 (screen of the WEB browser) at the terminal unit 10. At this time, in order to increase the updating speed, the canvas 36 is virtually divided into rectangles and managed. FIG. 3 shows one example of rectangle dividing. In FIG. 3, the canvas 36 is divided into rectangles 40 of the same size by every predetermined number of pixels in the transverse direction (x-axis direction) and the longitudinal direction (y-axis direction) from the origin O. Herein, each individual rectangle 40 will be called a "cell". The size of each individual cell is sufficiently smaller than the size of the total display area of the display 18, and can be set to about 48 pixels in each of the longitudinal and transverse directions, for example. The address of the cell 40 counted from the origin O in the canvas 36 will be represented as {X, Y} (X=0, 1, 2, . . . , M, Y=0, 1, 2, . . . , N). The echo back is executed by supplying the image of the cell (virtual split image, cell image) in which the image contents are modified through the image manipulation process based on the drawing operation from the HTTP server 12 to the WEB browser of the terminal unit 10. In an example of FIG. 3 corresponding to FIG. 2*a*, if the mouse cursor is placed at any position P1 ($x_1, y_1$) on the canvas 36, and the mouse button is pressed, the image 38 by means of the brush is drawn in the circle with radius r centered at the mouse cursor P1 ($x_1, y_1$). As a result, the image contents of fourteen cells in the area where the X coordinate is 4, 5, 6, 7 and the Y coordinate is 3, 4, 5, 6, surrounded by the heavy line in FIG. 3, are modified. Thus, the WEB browser makes HTTP requests for the fourteen cell images after modification, and the HTTP server 12 cuts out the fourteen cell images from the held images having undergone the image manipulation process and transmits them to the WEB browser. The WEB browser displays each received cell image in the corresponding rectangular area of the image displayed on the display 18, instead of the image being displayed so far in the corresponding rectangular area. In this manner, the echo back is executed. And the above image manipulation process and the echo back process are executed every time the cursor is moved (the cursor coordinate is changed on the image), so that the image manipulation process and the echo back are executed in real time, following the drawing operation. At this time, only the cell image(s) in which the image contents are modified is (are) transmitted from the HTTP server 12, whereby the image display can be updated faster than the case where the entire drawing operation object image is transmitted. The image display may be also updated by making requests for all the cell images in a rectangular area covering the entire area where the image contents are modified (possibly including the cell image(s) in which the image contents are not modified, adjacent to the cell(s) in which the image contents are modified) to the HTTP server, as in Formula 4 or a method of FIG. 7 *a* & *b* as will be described later.

Figure 4:
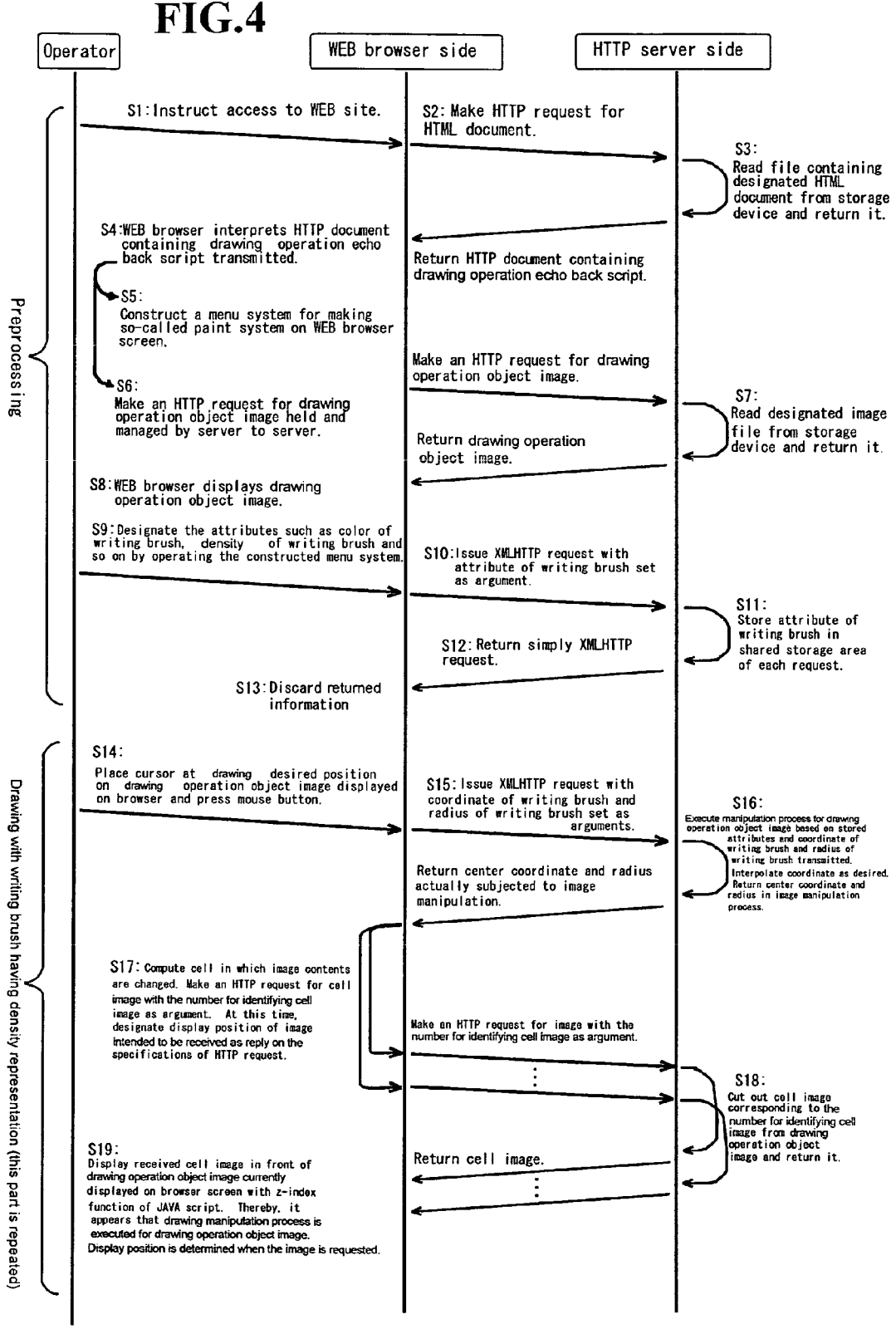
FIG. 4 is a flowchart showing a procedure according to an embodiment 1 of the invention.

Referring to FIG. 4, a procedure, for executing successively the image manipulation process for the drawing operation object images on the HTTP server 12 side in response to the drawing operation on the browser screen by the operator of the terminal unit 10 and for updating successively the drawing operation object images displayed on the display 18 of the terminal unit 10 as the echo back using the system of FIG. 1, will be described below. To begin with, a preprocessing before actually starting the drawing operation will be described below. When the operator starts the WEB browser at the terminal unit 10 and makes an instruction operation for access to the HTTP server 12 (WEB site) (S1), the WEB browser transmits an HTTP request for the HTML document to the HTTP server 12 (S2). The HTTP server 12 receives this request, and reads and returns a file including the designated HTML document from the storage device 32 (S3). The HTTP server 12 may generate the HTML document using a cgi program, instead of reading the file including the HTML document from the storage device 32, and return the HTML document. This HTML document stores the drawing operation echo back script (by means of internal description or an external file) in JAVASCRIPT executable by the WEB browser of the terminal unit 10. The WEB browser interprets the HTML document including the drawing operation echo back script transmitted (S4). Thereafter, the process on the WEB browser side is executed by this JAVASCRIPT.

The WEB browser constructs (displays) a menu system (tool box for selecting the drawing tool or setting the attribute) for configuring the so-called paint system on the screen of the WEB browser (S5). The construction of the menu system on the WEB browser screen can be realized by a well-known method for constructing the menu system in JAVASCRIPT on the screen of the WEB browser. And the menu images are read with a plurality of HTTP requests and the menu is assembled on the screen of the WEB browser.

Also, the information (cell size, addressing method, etc.) required for identifying each cell position on the canvas 36 set on the HTTP server 12 side is defined on the WEB browser. The WEB browser further makes an HTTP request for the drawing operation object image held and managed by the HTTP server 12 to the HTTP server 12 (S6). A program list example of a series of JAVASCRIPT for defining the cells and requesting the drawing operation object image is shown in Formula 1.

[Formula 1]

```
// Generate a square canvas image of 480 pixels by 480 pixels to simplify the explanation.
        blk= new bsBlock(ge('cCB'), 0, 0, 480, 480);
    //Here, "cCB" is the name of the base for arranging the already prepared canvas, that does not
    // exist in this code.
    // This function designs a layout of canvas image on base "bs" and loads an initial canvas
    // image into the layout of canvas image.
    // Since depth information can be added with z-index when loading the canvas image on browser,
    // the value is set to 2 here. If the canvas image is loaded and replaced every time of paint
    // operation with air brush or the like, it takes a lot of time, whereby the canvas image
    // is further divided and managed. In implementation here, the image is divided into ten in
    // length and width. Each split image will be called a cell.
    function bsBlock(bs, lft, top, len1, len2) {
        var      i,j,cnt;
        if( !bs ) bs = document.body;
        this.Left = parseInt(lft);            //Left: Left end of coordinate on canvas(coordinate with
        this.Top = parseInt(top);             //upper left of base as origin)
                                              //Top: Upper end of coordinate on canvas(coordinate with
                                              //upper left of base as origin)
        this.Len1 = parseInt(len1);           //Len1: Lateral size of canvas
        this.Len2 = parseInt(len2);           //Len2: Vertical size of canvas
        this.div1 = Len1/48;                  //div1: Number of dividing canvas (10 here)
        this.div2 = Len2/48;                  //div2: Number of dividing canvas (10 here)
        this.cWid = Math.floor(this.Len / this.div);   //cWid: Vertical and lateral size of one cell
        this.iNam = lft + "_" + top + "_" + len;       //Assembling process for file name of canvas image
        this.bShow = false;
        this.sub = null;
        this.Lock = false;
        this.base = document.createElement("div");     //Creating div tag of base for control
        this.base.style.position = 'absolute';
        this.base.style.left = this.Left;
        this.base.style.top = this.Top;
        this.base.style.width = this.Len1;
        this.base.style.height = this.Len2;
        this.ibs = document.createElement("img");      //Creating img tag of image
        this.ibs.style.position = 'absolute';
        this.ibs.style.left = 0;
```

[Formula 1]

```
this.ibs.style.top = 0;
this.ibs.style.width = this.Len1;
this.ibs.style.height = this.Len2;
this.ibs.style.zIndex = 2;                        //Read initial image here. Here,
                                                  //the depth in this case is 2 in z-indes value.
this.ibs.src = cgi + "?GetImg&PS=" + this.iNam + "&serial=" + serCnt++ + "&usr=" + user;
                                                  //Character string assembling process and request
                                                  // process for Http request for downloading image
bs.appendChild(this.base);
this.base.appendChild(this.ibs);
cnt = 0;                                          //Following loop is initialization of variable for
                                                  //managing cell this.cell = new Array;
for(i=0; i<this.div2; i++) {
    for(j=0; j<this.div1; j++) {
        this.cell[cnt] = null;
        cnt++;
    }
}
this.celCnt = cnt;                                //celCnt: Substitution of total number of cells
                                                  //(10*10=100 in implementation)
}
```

The HTTP server 12, upon receiving the HTTP request for the drawing operation object image, reads a designated image file from the bit map image data storage area 30, and returns it as the drawing operation object image (S7). The WEB browser receives and displays this drawing operation object image (S8). The operator manipulates the menu system displayed on the screen of the WEB browser to designate the attributes, including the color of brush tool, master density, cross-sectional shape, density distribution pattern, drawing size, and presence or absence of interpolation (S9). The WEB browser issues an XMLHTTP request, with the designated attributes of the brush except the drawing size, set as the arguments (S10). A program list example of JAVASCRIPT for issuing the XMLHTTP request is shown in Formula 2.

The HTTP server 12, upon receiving this XMLHTTP request, saves the attribute information (color, master density, cross-sectional shape, density distribution pattern, and presence or absence of interpolation) of the brush included in the request in the brush attribute information storage area 28 of the shared memory 26 (S11). The HTTP server 12 returns dummy information as a response to the XMLHTTP request (S12). The WEB browser, upon receiving this response, discards it without using it (S13). Instead of the dummy information, error information (information notifying the presence or absence of error) may be returned. Through the above, the preprocessing is completed, whereby the operator is ready for the drawing operation.

[Formula 2]

```
function setBrush( ) {
    if( xreq ) {
        if( !xreq.readyState ) {            //Confirm that XMLHTTP request can be issued now.
            xreq.onreadystatechange = refXHRdata;
                                            //If state is changed (i.e., a response to this XMLHTTP request
                                            //is received), a function refXHRdata is called. This function
                                            //is to simply receive the response.
            xreq.open("POST", cgi + "?setCol", false);
                                            //In variable cgi, character string of a part of URL
                                            //is defined (in any other place).
                                            //selCol is this command name.
            xreq.setRequestHeader("Content-Type", "text/plain");
            xreq.send("red=" + pRed         //Designation of red color
                + "&green=" + pGrn          //Designation of green color
                + "&blue=" + pBlu           //Designation of blue color
                + "&den=" + pDen            //Designation of overall density
                + "&frm=" + tFrm            //Designation of cross-sectional shape such as circle or ellipse
                + "&pat=" + aPat            //Designation of density pattern of writing brush
                + "&kind=" + pBrKn          //Designation of presence or absence of interpolation when pressed
                                            //coordinates are separated
                + "&usr=" + user);          //Designation of the number for identifying the user
            xreq.abort( );
        }
        else
            reqSetb = true;                 //If XMLHTTP request can not be issued, this
                                            //flag is set up to allow retry later.
    }
}
```

Next, a process during the time when the operator actually operates the drawing operation in a state where the preprocessing is completed in the above way will be described below. When the operator places the mouse cursor at a desired drawing position on the drawing operation object image displayed on the WEB browser and presses the mouse button down (S14), this causes as a trigger the WEB browser to issue an XMLHTTP request with the coordinate of the brush tool (coordinate of the mouse cursor) on the image and the drawing size (drawing radius) of the brush tool designated in the attribute settings set as the arguments (S15). A program list example of JAVASCRIPT for issuing the XMLHTTP request is shown in Formula 3.

[Formula 3]

```
//To server, transmit
//    coordinate of writing brush tool (mouse cursor),
//    radius of writing brush tool and
//    user ID, and
//make a request for acquiring
//    the center coordinate and
//    radius
//of image actually manipulated by the writing brush computation module 22 as a reply, in which a function (xgetDrawPos)
//to be started when there is a corresponding reply response is further defined. However, the center coordinate
//and radius of request do not appear on this program code, but appear within the function defined here.
function sendPoint(xst, yst) {
                                                    //xst, yst: Coordinate information is stored.
    if( xreq ) {
        if( (reqCnt < 4 ) && (!xreq.readyState || (!msie && !xtout)) ) {
            xreq.onreadystatechange = xgetDrawPos;    //Setting that the result is to be processed
                                                      //by the function "xgetDrawPos".
            xreq.open("POST", cgi + "?putAbrh", true);
            xreq.setRequestHeader("Content-Type", "text/plain");
            xreq.send("x=" + xst + "&y=" + yst + "&rad=" + pRad + "&usr=" + user):
                                                //Issue xmlhttp request
                                                //xst: X coordinate of writing brush tool transmitted
                                                //yst: Y coordinate of writing brush tool transmitted
                                                //pRad: Value of radius as global variable
                                                //user: User ID
        }
    }
}
```

The HTTP server 12, upon receiving this XMLHTTP request, executes the image manipulation process by means of the brush tool on the drawing operation object image held and managed by itself, using an image processing program, based on the brush tool attributes (color, master density, cross-sectional shape, density distribution pattern, and presence or absence of interpolation) stored in advance, and the coordinate and drawing radius of the brush tool transmitted at this time. In this manner, the image processing program can start the image manipulation process in response to the drawing operation immediately from the drawing operation (i.e., without waiting for the computational result of the cells in which the image contents are modified through the image manipulation process). The HTTP server 12 returns the center coordinate (coordinate of the brush tool) and the drawing radius where the image manipulation process has actually been executed (or to be executed from now) as a response to the XMLHTTP request (S16). In the case where the "present" is designated in the presence or absence of interpolation in the attribute settings and in the case where the coordinate of the brush tool transmitted with the previous XMLHTTP request and the coordinate of the brush tool transmitted with the XMLHTTP request at this time are spaced apart from one another, the image manipulation process is executed after making the interpolation (line interpolation or spline interpolation) between/among the coordinates, and a plurality of interpolated center coordinates and drawing radius are returned.

The WEB browser, upon receiving the center coordinates and drawing radius in the image manipulation process, computes to identify the cells, into which the drawing operation object image is virtually divided, in which the image contents are modified in the image manipulation process, based on the received information. And the WEB browser issues HTTP requests for the corresponding cell images with the identification number (e.g., numerical value of combining the X and Y coordinates in FIG. 3) for identifying the cells obtained by the computation as the argument (S17). At this time, based on the specifications of the HTTP request, the display positions (positions on the basis of the origin on the browser screen) of the cell images intended to be received as a reply are designated. Since the HTTP request is issued for each cell image requested, one or more HTTP requests may be issued.

The HTTP server 12, upon receiving the HTTP request, cuts out and returns the image in the rectangular area corresponding to the identification number of the cell designated by the request from the drawing operation object image held and managed by itself (S18). The WEB browser displays the transmitted cell image in the corresponding area (display position designated when requesting the image) on the browser screen in front of the image displayed at present by means of a z-index function. That is, when the reception of one cell image is completed, the z-index of the new cell image is set to a larger value than the z-index of the image displayed in the area at present, whereby the new cell image is arranged frontward and displayed (S19). Through the above process, the HTTP server 12 transmits only the images of the cells in which the image contents are modified, whereby the image display can be updated faster than the case where the entire drawing operation object image is transmitted. A program list example of JAVASCRIPT for computing to identify the each cell in which the image contents are modified, issuing each HTTP request based on the computation and displaying the each cell image transmitted as a response to the each HTTP request in front of the image displayed at present by means of the z-index function is shown in Formula 4 and Formula 5. In Formula 4, to facilitate the computation, the cells included in the minimum rectangular area including all the cells in which the image contents are modified are computed to be identified, instead of computing to identify all the exact cells in which the image contents are modified. That is, in the example of FIG. 3, sixteen cells included in the rectangular area in which the X coordinate is 4, 5, 6, 7 and the Y coordinate is 3, 4, 5, 6 (the same area as being surrounded by the heavy line in FIG. 7*b* as hereinafter described) are identified by computing. As a result, the sixteen cells include the cells {7,3} and {7,6} in which the image contents are not modified adjacent to the cells in which the image contents are modified, though this invention does not exclude the case where the WEB browser makes requests for the images including partly the images of cells in which the image contents are not modified to update the image display. Also in this case, the image display can be updated faster than the case where the entire drawing operation object image is transmitted.

[Formula 4]

```
//Acquiring changed coordinate/radius of writing brush and calling the update process.
function xgetDrawPos( ) {
    if (xreq.readyState == 4) {                          //This value of 4 indicates that reading of
                                                         //reply to the request is ended.
        xtout = 0;
        if (xreq.status == 200) {
            var        __obj,__pos,__rad,x,y,r;
            __obj = xreq.responseText.split('¥n');
            __pos = __obj[0].split(',');                 //Acquisition of coordinate value
            __rad = __obj[1] ? __obj[1].split(',') : ''; //Acquisition of diameter of writing brush
            x = parseInt(__pos[0]);
            y = parseInt(__pos[1]);
            r = parseInt(__rad[0]);
            blk.Active(x, y, r);                         //Calling part of update process (function)
        }
        xreq.abort( );
        if( reqUpSend ) {
            reqUpSend = false;
            sendPointUp( );
        }
    }
}
//Function for calling the function of acquiring the cell in which there is possibility of change from coordinate of
//changed point and diameter of writing brush and requesting the image
bsBlock.prototype.Active = function(xp, yp, rad) {
    var        i,j,x,y,cnt,ss;
    xs = Math.floor((xp - rad) / this.cWid);             //floor( ): Returns the smallest integer - rounding down
    ys = Math.floor((yp - rad) / this.cWid);
    xe = Math.ceil((xp + rad) / this.cWid);              //ceil( ): Returns the largest integer - rounding up
    ye = Math.ceil((yp + rad) / this.cWid);
    if( !this.Lock && (this.bShow || (xe > 0 && ye > 0 && xs < this.div && ys < this.div)) ) {
        this.bShow = false;
        for(i=0; i<this.div; i++) {
            for(j=0; j<this.div; j++) {
                cnt = i * this.div + j;                  //Cell is transformed into one dimention because it is
                                                         //managed in one dimention.
                if( i >= xs && i < xe && j >= ys && j < ye ) {
                    if( !this.cell[cnt] ) {              //Generate image tag at the first time to request image.
                        x = this.Left + this.cWid*i;
                        y = this.Top + this.cWid*j;
                        ss = x + "_" + y + "_" + this.cWid;
                        this.cell[cnt] = new bsCell(this.base, this.cWid*i, this.cWid*j, this.cWid, ss);
                                                         //Generate tag with new in this line.
                    }
                    else if( !this.cell[cnt].Lock )
                        this.cell[cnt].loadImg( );
                                                         //Since the image tag is already created at the second and
                                                         //following times, the function of requesting image in simply called.
                    else
                        this.cell[cnt].reqLd = true;
                                                         //Defer read request because image is being updated.
                    this.bShow = true;
                }
                else if( this.cell[cnt] && this.cell[cnt].Lock )
                    thin.bShow = true;
            }
        }
        if( !this.bShow )
            this.reqDraw = true;
    }
};
//Request for cell image at the first time.
//In implementation, there is double buffer of cell A and cell B, in which
//image is loaded into cell A at the first time.
function bsCell(bs, lft, top, len, ist) {                //Image is read into cell A, Z-INDEX=4
```

```
        if( !bs ) bs = document.body;
        this.Len = parseInt(len);
        this.xp = parseInt(lft) + Math.floor(this.Len/2);
        this.yp = parseInt(top) + Math.floor(this.Len/2);
        this.iNam = ist;
        this.pNde = bs;
        this.Lock = true;
        this.reqLd = false;
        this.Lcnt = 0;
        this.Bside = null;
        this.Aside = document.createElement("img");      //Generate tag of image for cell A
        this.Aside.style.position = 'absolute';
        this.Aside.style.left = lft;
        this.Aside.style.top = top;
        this.Aside.style.width = this.Len;
        this.Aside.style.height = this.Len;
        this.Aside.style.zIndex = 4;                     //Set to front (z-index value: 4)
        this.Aside.style.visibility = 'hidden';
        this.Aside.onload = makeFnc(this.setLoad, this); //Post-processing of image
        this.Aside.src = cgi + "?GetImg&PS=" + this.iNam + "&serial=" + serCnt++ + "&usr=" + user;
                                                         //Read instruction of image
        this.Lcnt = 1;
}
                              (Continued from Formula 4)
                                    [Formula 5]

//Request cell image at the second and following times
bsCell.prototype.loadImg = function( ) {
        this.Lock = true;
        this.Lcnt = 0;
        this.Bside = document.createElement("img");      //Generate tag of image for cell B
        this.Bside.style.position = 'absolute';
        this.Bside.style.left = this.Aside.style.left;
        this.Bside.style.top = this.Aside.style.top;
        this.Bside.style.width = this.Len;
        this.Bside.style.height = this.Len;
        this.Aside.style.zIndex = 3;                     //Z-INDEX=3 for cell A backward
        this.Bside.style.zIndex = 4;                     //Z-INDEX=4 for cell B frontward
        this.Bside.style.visibility = 'hidden';
        this.Bside.onload = makeFnc(this.setLoad, this);
        this.Bside.src = cgi + "?GetImg&PS=" + this.iNam + "&serial=" + serCnt++ + "&usr=" + user;
                                                         //Read instruction of image
        this.Lcnt = 1;
};
//Processing function after reading common cell image
bsCell.prototype.setLoad = function(e) {
        if( this.Bside ) {
                this.pNde.appendChild(this.Bside);       //Added to tree structure of html at this time and displayed
                this.Bside.style.visibility = 'visible';
                rmImage.unshift(this.Aside);
                this.Aside = this.Bside;                 //Copy information of cell B to cell A
                this.Bside = null;                       //Clear cell B
        }
        else {
                this.pNde.appendChild(this.Aside);       //Added to tree structure of html at this time and displayed
                this.Aside.style.visibility = 'visible';
        }
        this.Lock = false;
        if( this.reqLd ) {                               //Reading process for image deferred
                this.reqLd = false;                      //because another image is being read
                this.loadImg( );
        }
};
```

Through the above process, the display is updated (echo backed) on the screen of the WEB browser along with the drawing operation, as if the drawing manipulation process were executed for the drawing operation object image. And the transmission (S15) of the coordinate and drawing radius of the brush tool with the XMLHTTP request is executed successively every time the coordinate of the brush tool is changed (every time the detection coordinate of the brush tool is changed with the onMouseMove event, that is, for every adjacent pixel if the moving speed of the brush tool is slower, or for every sporadic-detected-position pixel if the moving speed is faster). That is, the transmission of coordinate information of the cursor position is made successively without waiting for the images subjected to manipulation process based on the coordinate information of the cursor position transmitted with the former XMLHTTP requests to be displayed on the screen of the WEB browser. Thereby, the drawing by means of the brush tool is executed successively, following the movement of the brush tool. Also, the echo back is accordingly executed in real time.

Embodiment 2

In the embodiment 1, the WEB browser computes the cells in which the image contents are modified and makes requests for the corresponding cell images to the HTTP server 12 every time the coordinate of the brush tool is changed. According to this method, since the corresponding cell images are transmitted from the HTTP server 12 every time the coordinate of the brush tool is changed, there is the possibility that the communication session on the WEB browser becomes insufficient (the number of cell images to be received is too large to receive the corresponding cell images), and that the echo back is not displayed in real time on the browser screen. Then, the cells in which the image contents are modified in the overall image manipulation process based on the coordinate changes multiple times are computed, and requests for the corresponding cell images (images having undergone the image manipulation process due to the coordinate changes multiple times) are transmitted to the HTTP server 12 every nth time the coordinate of the brush tool is changed. In this manner, the corresponding cell images are transmitted from the HTTP server 12 every nth time the coordinate of the brush tool is changed, whereby the number of cell images transmitted from the HTTP server 12 can be smaller than the case where the corresponding cell images are transmitted from the HTTP server 12 every time the coordinate of the brush tool is changed, and the insufficient communication session of the WEB browser can be relieved.

Embodiment 3

Though the transmission (S15 of FIG. 4) of the coordinate and drawing radius of the brush tool with the XMLHTTP request is executed every time the coordinate of the brush tool is changed in the embodiment 1, there is the possibility that the communication session on the WEB browser side becomes insufficient (i.e., the communication session is spent only for the transmission of the coordinate and drawing radius of the brush tool with the XMLHTTP request, so that the reception of the cell images subjected to manipulation process can not be followed), so that the echo back may not be displayed in real time on the browser screen. Thus, instead of transmitting the coordinate and drawing radius of the brush tool with the XMLHTTP request every time the coordinate of the brush tool is changed, a set of plural changed coordinates and drawing radius is collectively transmitted with one XMLHTTP request every time the coordinate of the brush tool is changed a predetermined number of times. In this manner, the number of transmitting (S15 in FIG. 4) the coordinate and drawing radius of the brush tool with the XMLHTTP request is reduced, whereby the insufficient communication session of the WEB browser can be relieved. In this case, using the method of the embodiment 2 together, if the cells in which the image contents are modified in the overall image manipulation process based on the plural coordinates transmitted with the one XMLHTTP request is computed, and requests for the corresponding cell images (images having undergone the image manipulation process with the plural coordinates) are transmitted to the HTTP server 12, the insufficient communication session on the WEB browser can be further relieved.

Figure 5:
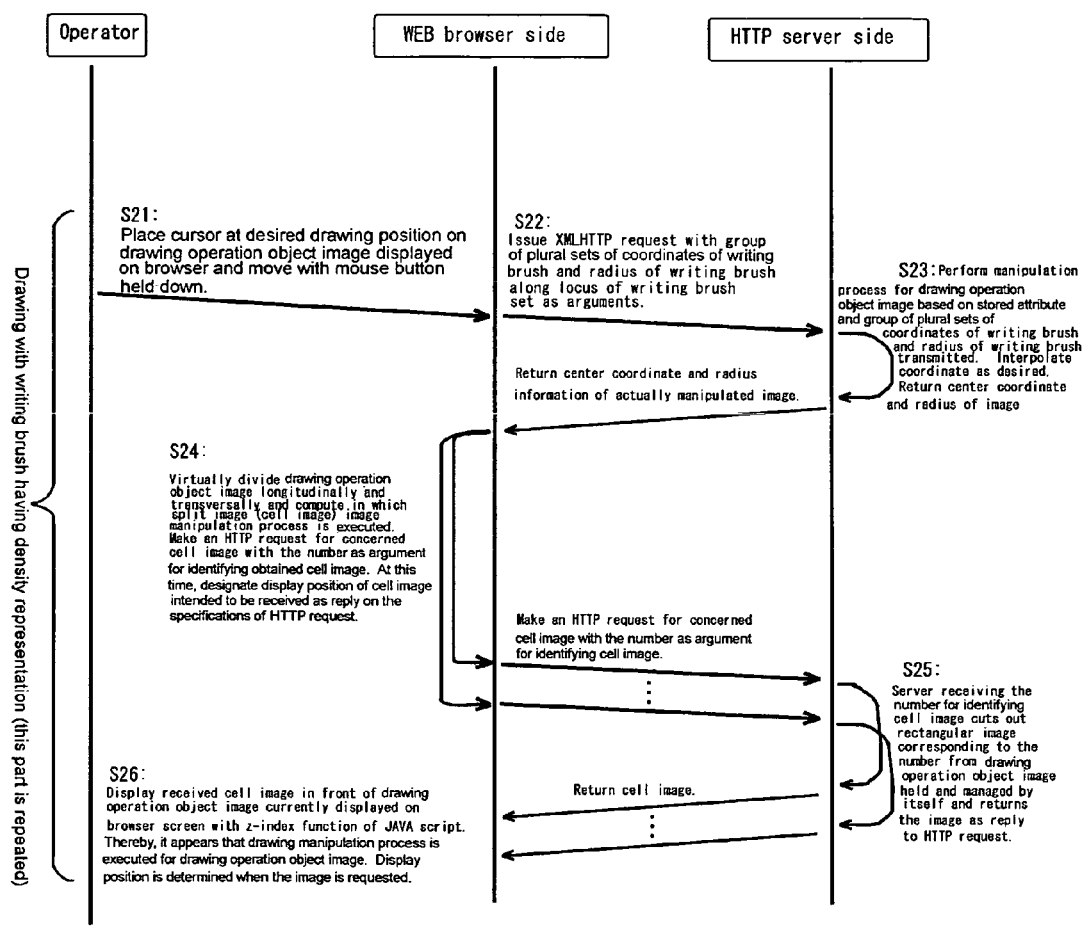
FIG. 5 is a flowchart showing a procedure according to an embodiment 3 of the invention.

Referring to FIG. 5, a procedure according to an embodiment 3 will be described below. Herein, the method of the embodiment 2 is used together. Since a preprocessing is the same as described previously in the embodiment 1, the explanation of the preprocessing is omitted. In a state where the preprocessing is completed, if the operator places the mouse cursor at the position desired to draw in the drawing operation object image displayed on the WEB browser, and moves the mouse cursor with the mouse button held down (S21), the WEB browser issues an XMLHTTP request with plural sets of coordinates along which the brush tool is moved on the image and the drawing radius of the brush tool designated in the attribute settings set as the arguments (S22). The number of the sets in the arguments is from about 2 to 4, for example. A program list example of JAVASCRIPT for issuing this XMLHTTP request is shown in Formula 6 and Formula 7.

[Formula 6]

```
//Acquiring changed coordinate/radius of writing brush and calling the update process.
function xgetDrawPos( ) {
    if (xreq.readyState == 4) {                    //This value of 4 indicates that reading of reply
                                                   //to the request is ended
        xtout = 0;
        if (xreq.status == 200) {
            var i,j,__obj,__pos,__rad,x,y,r;
            __obj = xreq.responseText.split('¥n');
            __pos = __obj[0].split(',');           //Acquisition of coordinate value
            __rad = __obj[1] ? __obj[1].split(',') ; '';   //Acquisition of diameter of writing brush
            for(i=0; i<__pos. length/2; i++) {     //Coordinate and diameter are transmitted with list in comma format
                x = parseInt(__pos[i*2]);
                y = parseInt(__pos[i*2+1]);
                r = __rad. length > i ? parseInt(__rad[i]) ; pRad;
                blk.Active(x, y, r);               //Calling part of update process (function)
            }
                                                   The only one difference from Formula 4.
        }
        xreq.abort( );
        if( reqUpSend ) {
            reqUpSend = false;
            sendPointUp( );
        }
    }
}
//Function for calling the function of acquiring the cell in which there is possibility of change from coordinate of
//changed point and diameter of writing brush and requesting the image
bsBlock.prototype.Active = function(xp, yp, rad) {
    var        i, j, x, y, cnt, ss;
    xs = Math.floor((xp − rad) / this.cWid);       //floor( ): Returns the smallest integer - rounding down
    ys = Math.floor((yp − rad) / this.cWid);
```

```
        xe = Math.ceil((xp + rad) / thiscWid);              //ceil( ): Returns the largest integer - rounding up
        ye = Math.ceil((yp + rad) / this.cWid);
        if( !this.Lock && (this.bShow || (xe > 0 && ye > 0 && xs < this.div && ys < this.div)) ) {
                this.bShow = false;
                for(i=0; i<this.div; i++) {
                        for(j=0; j<this.div; j++) {
                                cnt = i * this.div + j;             //Cell is transformed into one dimention because it is
                                                                    //managed in one dimention.
                                if( i >= xs && i < xe && j >= ys && j < ye ) {
                                        if( !this.cell[cnt] ) {     //Generate image tag at the first time to request image
                                                x = this.Left + this.cWid*i;
                                                y = this.Top + this.cWid*j;
                                                ss = x + "_" + y + "_" + this.cWid;
                                                this.cell[cnt] = new bsCell(this.base, this.cWid*i, this.cWid*j, this.cWid, ss);
                                                        //Generate tag with new in this line
                                        }
                                        else if( !this.cell[cnt].Lock )
                                                this.cell[cnt].loadImg( );
                                                        //Since the image tag is already created at the second and following times.
                                                        //the function of requesting image in simply called
                                        else
                                                this.cell[cnt].reqLd = true;
                                                        //Defer read request because image is being updated
                                        this.bShow = true;
                                }
                                else if( this.cell[cnt] && this.cell[cnt].Lock )
                                        thin.bShow = true;
                        }
                }
                if( !this.bShow )
                        this.reqDraw = true;
        }
};
//Request for cell image at the first time
//In implementation, there is double buffer of cell A and cell B, in which
//image is loaded into cell A at the first time.
function bsCell(bs, lft, top, len, ist) {                   //Image is read into cell A, Z-INDEX=4
        if( !bs ) bs = document.body;
        this.Len = parseInt(len);
        this.xp = parseInt(lft) + Math.floor(this.Len/2);
        this.yp = parseInt(top) + Math.floor(this.Len/2);
        this.iNam = ist;
        this.pNde = bs;
        this.Lock = true;
        this.reqLd = false;
        this.Lcnt = 0;
        this.Bside = null;
        this.Aside = document.createElement("img");         //Generate tag of image in cell A
        this.Aside.style.position = 'absolute';
        this.Aside.style.left = lft;
        this.Aside.style.top = top;
        this.Aside.style.width = this.Len;
        this.Aside.style.height = this.Len;
        this.Aside.style.zIndex = 4;                        //Set to front (z-index value: 4)
        this.Aside.style.visibility = 'hidden';
        this.Aside.onload = makeFnc(this.setLoad, this);    //Post-processing of image
        this.Aside.src = cgi + "?GetImg&PS=" + this.iNam + "&serial=" + serCnt++ + "&usr=" + user;
                                                            //Read instruction of image
        this.Lcnt = 1;
}
                                        (Continued from Formula 6)
                                                [Formula 7]

//Request cell image at the second and following times
bsCell.prototype.loadImg = function( ) {
        this.Lock = true;
        this.Lcnt = 0;
        this.Bside = document.createElement("img");         //Generate tag of image for cell B
        this.Bside.style.position = 'absolute';
        this.Bside.style.left = this.Aside.style.left;
        this.Bside.style.top = this.Aside.style.top;
        this.Bside.style.width = this.Len;
        this.Bside.style.height = this.Len;
        this.Aside.style.zIndex = 3;                        //Z-INDEX=3 for cell A backward
        this.Bside.style.zIndex = 4;                        //Z-INDEX=4 for cell B frontward
        this.Bside.style.visibility = 'hidden';
        this.Bside.onload = makeFnc(this.setLoad, this);
        this.Bside.src = cgi + "?GetImg&PS=" + this.iNam + "&serial=" + serCnt++ + "&usr=" + user;
                                                            //Read instruction of image
        this.Lcnt = 1;
```

-continued

```
};
//Processing function after reading common cell image.
bsCell.prototype.setLoad = function(e) {
    if( this.Bside ) {
        this.pNde.appendChild(this.Bside);        //Added to tree structure of html at this time and displayed
        this.Bside.style.visibility = 'visible';
        rmImage.unshift(this.Aside);
        this.Aside = this.Bside;                  //Copy information of cell B to cell A
        this.Bside = null;                        //Clear cell B
    }
    else {
        this.pNde.appendChild(this.Aside);        //Added to tree structure of html at this time and displayed
        this.Aside.style.visibility = 'visible';
    }
    this.Lock = false;
    if( this.reqLd ) {                            //Reading process for image deferred because
        this.reqLd = false;                       //another image is being read
        this.loadImg( );
    }
};
```

The HTTP server 12, upon receiving the XMLHTTP request, executes the image manipulation process by means of the brush tool on the drawing operation object image held and managed by itself, using an image processing program, based on the brush tool attributes (color, master density, cross-sectional shape, density distribution pattern, and presence or absence of interpolation) stored in advance, and plural sets of coordinates and drawing radius of the brush tool transmitted at this time. And the HTTP server 12 returns the plural center coordinates (coordinates of the brush tool) and the drawing radius where the image manipulation process has actually been executed (or to be executed from now) as a response to the XMLHTTP request (S23). In the case where the "present" is designated in the presence or absence of interpolation of the attribute settings and also in the case of where the plural coordinates of the brush tool transmitted at this time are spaced apart from one another, the image manipulation process is executed after making the interpolation between/among the coordinates, and the center coordinates increased in the number by interpolation and drawing radius are returned. Also, if the last coordinate of the brush tool transmitted with the previous XMLHTTP request and the first coordinate of the brush tool transmitted with the XMLHTTP request at this time are spaced apart from one another, the image manipulation process is executed after making the interpolation between/among the coordinates, and the center coordinates produced by interpolation and drawing radius are returned.

The WEB browser, upon receiving the plural center coordinates and drawing radius of the image manipulation process, computes in which cells, into which the drawing operation object image is divided, the image contents are modified in the image manipulation process over the plural center coordinates, based on the received information. And the WEB browser issues HTTP requests for the corresponding cell images with the identification number (e.g., numerical value of combining the X and Y coordinates in FIG. 3) as arguments for identifying the cells obtained by the computation (S24). At this time, based on the specifications of the HTTP request, the display positions (positions on the basis of the origin on the browser screen) of the cell images intended to be received as a reply are designated. This HTTP request is the same request as at step S17 (FIG. 4) in the embodiment 1, except for the possibility that the number of requests is increased. The HTTP server 12 cuts out the requested cell images from the final image subjected to manipulation process with the plural coordinates and drawing radius of the brush tool at this time (e.g., image having undergone the manipulation process with all the four coordinates if the four coordinates of the brush tool are treated as one set) and transmits them to the WEB browser (S25). A process for transmitting the cell image from the HTTP server 12 in response to this HTTP request and a process for receiving and displaying the cell image on the WEB browser (S26) are the same as at steps S18 and S19 in the embodiment 1.

The transmission (S21) of plural sets of coordinates and drawing radius of the brush tool with the XMLHTTP request is executed successively every time the coordinate of the brush tool is changed a predetermined number of times (if the predetermined number of times is not reached within a predetermined time period from the previous transmission, it is transmitted after the passage of the predetermined time period), whereby the drawing by means of the brush tool is executed successively, following the movement of the brush tool. According to this embodiment 3, the number of XMLHTTP requests is smaller than the case where the XMLHTTP request is issued every time the coordinate of the brush tool is changed. Also, since the cell images are cut out from the image having undergone the manipulation process based on all the plural coordinates of the brush tool and are transmitted to the WEB browser, the number of cell images transmitted from the HTTP server 12 is smaller than the case where the cell images are cut out and transmitted to the WEB browser every time the coordinate of the brush tool is changed. This prevents the web browser side from suffering the communication session insufficiency.

Embodiment 4

Figure 6:
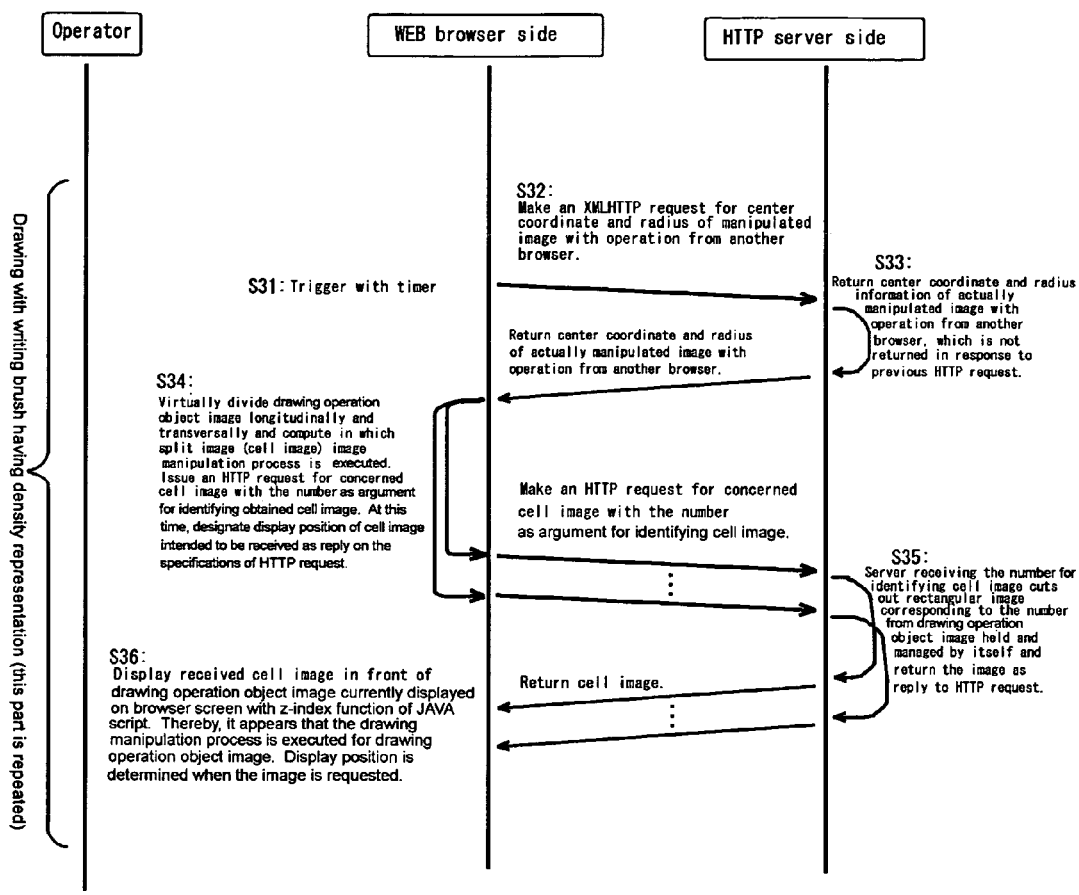
FIG. 6 is a flowchart showing a procedure according to an embodiment 4 of the invention.

In the above description, the cell images are echoed back to the terminal unit 10 based on the drawing operation from the same terminal unit 10 in the previous embodiment. Even when, however, the drawing operation for the drawing operation object image is operated at the terminal unit 10 and at another terminal unit simultaneously (or the drawing operation is operated singly at another terminal unit), the image subjected to manipulation process based on the drawing operation by another terminal unit may be echoed back to the terminal unit 10. Referring to FIG. 6, a procedure between the terminal unit 10 and the HTTP server 12 in this case will be described below. Since a preprocessing is the same as described previously in the embodiment 1, the explanation of the preprocessing is omitted.

In a state where the preprocessing is completed, the WEB browser transmits the coordinate and drawing radius of the brush tool with the XMLHTTP request based on the drawing operation at the terminal unit 10 in the same way as in the embodiment 1. And in parallel with the XMLHTTP requests based on the drawing operation, every time a predetermined set period passes with the trigger (S31) due to a timer event (setInterval or setTimeout, in which if setTimeout is used, setTimeout is set again after the set period), the WEB browser issues an XMLHTTP request for the set of center coordinates and drawing radius in the image manipulation process executed based on the drawing operation from the WEB browser at another terminal unit (S32). The HTTP server 12, upon receiving this request, returns the center coordinate and drawing radius, which are not returned in the reply to the XMLHTTP request with the previous timer trigger, among the center coordinates and drawing radius actually image manipulated (or to be manipulated from now) based on the operation from the WEB browser at another terminal unit (S33). A process (S34) for computing the cells in which the image contents are modified and transmitting HTTP requests for the corresponding cell images when the WEB browser receives this reply, a process (S35) for transmitting the cell images from the HTTP server 12 in response to these HTTP requests, and a process (S36) for receiving and displaying the cell images on the WEB browser are the same as at steps S17, S18 and S19 of the embodiment 1. Through the above processes, when the drawing operation for the drawing operation object image is operated at the terminal unit 10 and at another terminal unit simultaneously (or the drawing operation is singly operated at another terminal unit), the image subjected to manipulation process based on the drawing operation can be echoed back to the terminal unit 10. If another terminal unit executes the process in the same way as the terminal unit 10, based on the trigger with the timer event, the image manipulated with the drawing operation at the terminal unit 10 can be echoed back to another terminal unit, whereby it is possible to operate the drawing operation at each terminal unit at the same time while displaying the common image. A program list example of JAVASCRIPT for issuing the XMLHTTP request with the timer trigger is shown in Formula 8.

absence of interpolation) to the HTTP server 12 at the time of setting the attributes, and may be stored in the brush tool attribute information storage area 28 of the shared memory 26 of the HTTP server 12 and used for the image manipulation process.

[B] Though the WEB browser computes the cells in which the image contents are modified based on the center coordinate and drawing radius of the image manipulation process returned from the HTTP server 12 in the previous embodiments, instead the WEB browser may compute the cells in which the image contents are modified based on the self-holding information of the coordinate of the brush and of the drawing size at the time of drawing operation. Or the WEB browser may compute the cells in which the image contents are modified based on the center coordinate of the image manipulation process returned from the HTTP server 12 and on the self-holding information of the drawing radius. In the former case, if the image process is executed by interpolating the coordinate on the HTTP server 12 side, it is required that the WEB browser computes the cells in which the image contents are modified after making the same interpolation computation on the WEB browser side, in order that the WEB browser can compute correctly the cells in which the image contents are modified.

[C] Though the WEB browser side computes the cells in which the image contents are modified in the previous embodiments, instead the HTTP server 12 side may compute the cells in which the image contents are modified based on the center coordinate and drawing radius of the image manipulation process, and may transmit the identification number (e.g., numerical value of combining the X and Y coordinates in FIG. 3) of the cells obtained by the computation to the WEB browser.

[D] Or the HTTP server 12 side may transmit the coordinate information for specifying one rectangular area including the entire area where the image contents are modified based on the center coordinate and drawing radius of the image manipulation process to the WEB browser, and the WEB browser side may compute all the cells involved in the rectangular area. FIG. 7 *a* & *b* is an explanatory view thereof. FIG. 7*a*&*b* shows the same drawing state as in FIG. 2*a*. That

[Formula 8]

```
//Request for acquiring changed coordinate/radius of writing brush to update screen with timer.
function checkInterval( ) {
    if( xreq && (!xreq.readyState || !msie && !xtout) ) {
        xreq.onreadystatechange = xgetDrawPos;      //Setting that the result is processed
                                                     //by function "xgetDrawPos".
        xreq.open("POST", cgi + "?getChg", true);
        xreq.setRequestHeader("Content-Type", "text/plain");
        xreq.send("usr=" + user);                    // Issue xmlhttp request
    }
}
```

Other Embodiments

Some of the previous embodiments may be varied in various ways as follows.

[A] Though the information on the drawing size (radius or diameter) of the brush is not transmitted to the HTTP server 12 at the time of setting the attributes but is transmitted in a set with the coordinate of the brush when the drawing operation is actually operated in the previous embodiments, instead the information on the drawing size may be transmitted together with the other attributes (color, master density, cross-sectional shape, density distribution pattern and presence or is, if the mouse cursor is placed at any position P1 ($x_1$, $y_1$) on the canvas 36 as shown in FIG. 7*a* & *b* and the mouse button is pressed, the image 38 by means of the brush is drawn in a circle with radius r centered at the position P1 ($x_1$, $y_1$) of the mouse cursor. At this time, the minimum rectangular area including the entire image 38 is the area surrounded by the dotted line 42 in the same figure. This rectangular area 42 is specified by two coordinates P11 ($x_{11}$, $y_{11}$) and P12 ($x_{12}$, $y_{12}$) at the diagonal positions. Thus, the HTTP server 12 transmits the two coordinates P11 ($x_{11}$, $y_{11}$) and P12 ($x_{12}$, $y_{12}$) to the WEB browser. The WEB browser receives the two coordinates P11 and P12, and computes all the cells involved in the corresponding rectangular area 42. That is, as shown in FIG. 7b, sixteen cells in the area in which the X coordinate is 4, 5, 6, 7 and the Y coordinate is 3, 4, 5, 6, as surrounded by the heavy line in the figure, are obtained as all the cells involved in the rectangular area 42 specified by the two coordinates P11 and P12. And the WEB browser makes HTTP requests for the images for the sixteen cells to the HTTP server 12. The HTTP server 12, upon receiving these requests, cuts out the images for the sixteen cells from the held image having undergone the image manipulation process and transmits them to the WEB browser. The WEB browser receives each cell image, and displays it in the corresponding cell area of the image displayed on the browser screen instead of the image being displayed so far in the rectangular area. Though the sixteen cells include the cells {7,3} and {7,6} in which the image contents are not modified adjacent to the cells in which the image contents are modified, this invention does not exclude the case where the WEB browser makes requests for the cell images partly including the cell image in which the image contents are not modified and updates the image display. In this case, the image display can be updated faster than the case where the entire drawing operation object image is transmitted.

[E] Though the operator can set the drawing size of the brush in the previous embodiments, instead the HTTP server side may hold the drawing size of the brush as the fixed value from the beginning. In this case, if the WEB browser side computes the cells in which the image contents are modified, the HTTP server transmits the fixed value of the drawing size of the brush to the WEB browser. Also, if the HTTP server side computes the cells in which the image contents are modified and transmits them to the WEB browser, the HTTP server does not need to transmit the fixed value of the drawing size of the brush to the WEB browser.

[F] Though the z-index of the new cell image is set to a larger value than the z-index of the image displayed in the area at present, and the new cell image is arranged frontward and displayed to update the display image in the previous embodiments, instead the cell image displayed at present may be fully replaced with the new cell image (the cell image displayed up to now is unlinked from the HTML document at the same time of replacement) to update the display image.

[G] Though the drawing operation object image is virtually divided into plural cells for management (the number of image file is one) in the previous embodiment, instead the drawing operation object image may be actually divided into sliced images (the image file is provided for each sliced image, with the size of individual sliced image being 480 pixels in each of the longitudinal and transverse directions, for example) for management. Also, the drawing operation object image may be actually divided into sliced images (the image file is provided for each sliced image, with the size of individual sliced image being 480 pixels in each of the longitudinal and transverse directions, for example), and further each individual sliced image may be virtually divided into plural cells (the size of individual sliced image is 48 pixels in each of the longitudinal and transverse directions, for example) for management.

[H] Though the drawing density is varied in accordance with the moving speed for moving the cursor while holding the mouse button down (i.e., the "manner of the drawing operation" is the moving speed of the cursor) in the previous embodiments, the drawing density may be varied in accordance with the duration of pressing and holding the mouse button while keeping the cursor at one position (i.e., the "manner of the drawing operation" is the time or the like for pressing and holding the mouse button). In this case, the timer event (setInterval or setTimeout, in which if setTimeout is used, setTimeout is set again after the set period) is used, instead of the onMouseMove event. Since the coordinate position information of the cursor can not be acquired with the timer event, the coordinate of the brush tool acquired with the immediately previous onMouseMove event is used as the coordinate of the brush tool required for processing, and the center coordinate of the image manipulation process acquired as the response to the immediately previous XMLHTTP request is used as the center coordinate of the image manipulation process required for processing.

[I] Though the mouse is used as the pointing device in the previous embodiments, a tablet or other pointing devices may be used. If the tablet is used, the operation of pressing a stylus pen against the tablet corresponds to the operation of pressing the mouse button.

[J] Though the drawing shape of the brush tool is circular in the previous embodiments, any other shapes such as an ellipse or square may be used.

The invention claimed is:
1. An image display updating method for displaying an image on a screen of a WEB browser, installed into a terminal unit, in which the operator of said terminal unit operates a drawing operation using a pointing device on said screen to modify the display of the image at a cursor position by said pointing device by means of a brush tool having a density representation, the brush tool having a density representation representing a drawing tool for realizing the drawing in which the drawing density is varied according to a manner of the drawing operation of the pointing device,
  wherein a server holds and manages data of the image that becomes a drawing operation object for said operator and an image processing program that executes an image manipulation process on said image data in response to said drawing operation;
  said terminal unit and said server are set in a state mutually communicable via a network;
  when the WEB browser of said terminal unit makes an HTTP request for an HTML document to said server, said server returns to said terminal unit the HTML document in which a drawing operation echo back script interpretable by said WEB browser is described inside or the HTML document in, which reading said drawing operation echo back script as an external file is described as a response to said HTTP request, and the WEB browser of said terminal unit receives said HTML document and appends said drawing operation echo back script to said WEB browser;
  said HTML document, as a preprocessing, makes an HTTP request for said drawing operation object image held and managed by said server to said server and displays an image based on the image data received as a reply on the screen of said WEB browser;
  said drawing operation echo back scrip appended to the WEB browser of said terminal unit transmits to said server an XMLHTTP request with the coordinate information of the cursor position according to said drawing operation, when said drawing operation is operated on the screen where said image is displayed;
  the image processing program of said server executes the image manipulation process on said drawing operation object image held and managed by itself by means of the brush tool having said density representation, based on the received coordinate information of said cursor position and the information on the drawing size of the brush acquired additionally or held from the beginning;

said drawing operation echo back script, after transmitting the coordinate information of said cursor position, acquires the information of one or more rectangular areas including an area where the image contents are modified in said image manipulation process among a plurality of rectangular areas into which the image displayed on the screen of said WEB browser is divided and transmits one or more HTTP requests for selectively requesting the images in said one or more rectangular areas to said server;

said server receives said one or more HTTP requests, and selectively returns the image data of the corresponding one or more rectangular areas in the image displayed on the screen of said WEB browser, where said image manipulation process is completed; and said WEB browser displays the images of the received image data of one or more rectangular areas in the corresponding rectangular areas on the screen of said WEB browser, instead of the images being displayed so far in said rectangular areas.

2. The image display updating method according to claim 1, wherein said drawing operation echo back script computes by itself and acquires the information of one or more rectangular areas including the area where the image contents are modified in said image manipulation process.

3. The image display updating method according to claim 1, wherein said drawing operation echo back script acquires the information of one or more rectangular areas including the area where the image contents are modified in said image manipulation process by receiving the computation result of the image processing program in said server.

4. The image display updating method according to claim 1, wherein said drawing operation echo back script transmits the information on the drawing size of said brush to said server simultaneously with the coordinate information of said cursor position.

5. The image display updating method according to claim 1, wherein said drawing operation echo back script transmits the information on the drawing size of said brush to said server when the operator operates a setting operation of the drawing size of the brush.

6. The image display updating method according to claim 1, wherein the image processing program of said server executes said image manipulation process, based on the coordinate information of said cursor position received from said terminal unit and the information on the drawing size of the brush received simultaneously with the coordinate information of said cursor position from said terminal unit or held by said, server before receiving the coordinate information of said cursor position, and returns the coordinate information of a drawing center position of the brush to be drawn or having been drawn through said image drawing process as a response to the XMLHTTP request to the WEB browser of said terminal unit, and said drawing operation echo back script computes by itself and acquires the information of one or more rectangular areas including the area where the image contents are modified in said image manipulation process, using the coordinate information of the drawing center position of said brush received from said server and the information on the drawing size of the brush received simultaneously with the coordinate information of the drawing center position of the brush from said server or held by said drawing operation echo back script before receiving the coordinate information of the drawing center position of said brush.

7. The image display updating method according to claim 6, wherein the coordinate information of the drawing center position of said brush is the coordinate information of said cursor position itself or the coordinate information obtained by interpolating between/among the coordinates of said cursor position using the information of the coordinates of the cursor position.

8. The image display updating method according to claim 1, wherein said drawing operation echo back script computes by itself and acquires the information of one or more rectangular areas including the area where the image contents are modified in said image manipulation process, using the coordinate information of said cursor position acquired not by said server but by itself, and the information on the drawing size of the brush held by said drawing operation echo back script before acquiring the coordinate information of said cursor position.

9. The image display updating method according to claim 1, wherein when a drawing operation is operated for said drawing operation object image simultaneously from another terminal unit, said image processing program also executes the image manipulation process based on the drawing operation, said drawing operation echo back script periodically issues the XMLHTTP request with a timer drive, said image processing program returns the information of one or more rectangular areas including the area where the image contents are modified, which are computed by said image processing program, or the information required when the drawing operation echo back script computes said rectangular areas in said drawing operation echo back script, as a response to said XMLHTTP request, in response to the image manipulation process based on the drawing operation from said another terminal unit, said drawing operation echo back script transmits one or more HTTP requests for selectively requesting the images in one or more rectangular areas according to the information received and acquired from said server, or one or more rectangular areas according to the information computed by itself and acquired based on the information received from said server to said server, said server receives said HTTP requests, and returns selectively the image data in the corresponding one or more rectangular areas of the image displayed on the screen of said WEB browser, and said WEB browser displays the images of the received image data of one or more rectangular areas in the corresponding rectangular areas on the screen of said WEB browser, instead of the images being displayed so far in said rectangular areas.

10. The image display updating method according to claim 1, wherein the drawing operation object image held and managed by said server is composed of a single image file corresponding to the entire image, or a plurality of image files corresponding to a plurality of sliced images in which said entire image is actually divided into rectangles, and said rectangular area is the area of the virtual split image unit in which the image in one image file is virtually divided into plural rectangles.

11. The image display updating method according to claim 1, wherein the drawing operation object image held and managed by said server is composed of image files of a plurality of sliced images in which said entire image is actually divided into plural rectangles, and said rectangular area accords with the area of the sliced-image unit.

12. The image display updating method according to claim 1, wherein the drawing operation echo back script of said terminal unit transmits, for each XMLHTTP request, the information on a plurality of coordinate positions of said cursor position along a movement locus of the cursor with said drawing operation to said server, acquires the information of one or more rectangular areas including the area where the image contents are modified through the entire image manipulation process based on said plurality of coordinate positions, and transmits one or more HTTP requests for selectively requesting the images in said one or more rectangular areas to said server, when said drawing operation is operated on the screen where said image is displayed.

13. A server client system for performing the image display updating method according to claim 1.

14. A drawing operation echo back script that is a program for enabling said terminal unit to execute a process on said terminal unit for implementing the image display updating method according to claim 1, wherein said program is transmitted from said server and appended to said WEB browser on said terminal unit.

15. The image display updating method according to claim 1, wherein the WEB browser comprises software for perusing a WEB page and said software issues the request corresponding to the HTTP request and the request corresponding to the XMLHTTP request wherein said HTTP request or said XMLTTP request is issued under the name HTTP request or the name XMLHTTP request or a different name.

16. An image display updating method for displaying an image on a screen of a WEB browser installed into a terminal unit, in which the operator of said terminal unit operates a drawing operation using a pointing device on said screen to modify the display of the image at a cursor position by said pointing device by means of a brush tool having a density representation;
 wherein the brush tool having a density representation means a drawing tool for realizing the drawing in which the drawing density is varied according to a manner of the drawing operation of the pointing device;
 a server holds and manages data of the image that becomes a drawing operation object for said operator and an image processing program that executes an image manipulation process on said image data in response to said drawing operation;
 said terminal unit and said server are set in a state mutually communicable via a network;
 when the WEB browser of said terminal unit makes an HTTP request for an HTML document to said server, said server returns to said terminal unit the HTML document in which a drawing operation echo back script interpretable by said WEB browser is described inside or the HTML document in which reading said drawing operation echo back script as an external file is described as a response to said HTTP request, and the WEB browser of said terminal unit receives said HTML document and appends said drawing operation echo back script to said WEB browser;
 said HTML document, as a preprocessing, makes an HTTP request for said drawing operation object image held and managed by said server to said server and displays an image based on the image data received as a reply on the screen of said WEB browser;
 said drawing operation echo back scrip appended to the WEB browser of said terminal unit transmits to said server an XMLHTTP with the coordinate information of the cursor position according to said drawing operation, when said drawing operation is operated on the screen where said image is displayed;
 the image processing program of said server executes the image manipulation process on said drawing operation object image held and managed by itself by means of the brush tool having said density representation, based on the received coordinate information of said cursor position and the information on the drawing size of the brush acquired additionally or held from the beginning;
 said drawing operation echo back script, after transmitting the coordinate information of said cursor position, acquires the information of one or more rectangular areas including an area where the image contents are modified in said image manipulation process among a plurality of rectangular areas into which the image displayed on the screen of said WEB browser is divided and transmits one or more HTTP requests for selectively requesting the images in said one or more rectangular areas to said server;
 said server receives said one or more HTTP requests, and selectively returns the image data of the corresponding one or more rectangular areas in the image displayed on the screen of said WEB browser, where said image manipulation process is completed;
 said WEB browser displays the images of the received image data of one or more rectangular areas in the corresponding rectangular areas on the screen of said WEB browser, instead of the images being displayed so far in said rectangular areas;
 said WEB browser transmits the coordinate information of the cursor position with said XMLHTTP requests successively, after receiving a response to the previous XMLHTTP request, without waiting for the images subjected to manipulation process based on the coordinate information of the cursor position transmitted with the former XMLHTTP requests to be displayed on the screen of said WEB browser; and
 the image processing program of said server further repeats the image manipulation process for the images having undergone the image manipulation process based on the XMLHTTP request.

17. The image display updating method according to claim 16, wherein said drawing operation echo back script computes by itself and acquires the information of one or more rectangular areas including the area where the image contents are modified in said image manipulation process.

18. The image display updating method according to claim 16, wherein said drawing operation echo back script acquires the information of one or more rectangular areas including the area where the image contents are modified in said image manipulation process by receiving the computation result of the image processing program in said server.

19. The image display updating method according to claim 16, wherein said drawing operation echo back script transmits the information on the drawing size of said brush to said server simultaneously with the coordinate information of said cursor position.

20. The image display updating method according to claim 16, wherein said drawing operation echo back script transmits the information on the drawing size of said brush to said server when the operator operates a setting operation of the drawing size of the brush.

21. The image display updating method according to claim 16, wherein the image processing program of said server executes said image manipulation process, based on the coordinate information of said cursor position received from said terminal unit and the information on the drawing size of the brush received simultaneously with the coordinate information of said cursor position from said terminal unit or held by said server before receiving the coordinate information of said cursor position, and returns the coordinate information of a drawing center position of the brush to be drawn or having been drawn through said image drawing process as a response to the XMLHTTP request to the WEB browser of said terminal unit, and said drawing operation echo back script computes by itself and acquires the information of one or more rectangular areas including the area where the image contents are modified in said image manipulation process, using the coordinate information of the drawing center position of said brush received from said server and the information on the drawing size of the brush received simultaneously with the coordinate information of the drawing center position of the brush from said server or held by said drawing operation echo back script before receiving the coordinate information of the drawing center position of said brush.

22. The image display updating method according to claim 21, wherein the coordinate information of the drawing center position of said brush is the coordinate information of said cursor position itself or the coordinate information obtained by interpolating between/among the coordinates of said cursor position using the information of the coordinates of the cursor position.

23. The image display updating method according to claim 16, wherein said drawing operation echo back script computes by itself and acquires the information of one or more rectangular areas including the area where the image contents are modified in said image manipulation process, using the coordinate information of said cursor position acquired not by said server but by itself, and the information on the drawing size of the brush held by said drawing operation echo back script before acquiring the coordinate information of said cursor position.

24. The image display updating method according to claim 16, wherein when a drawing operation is operated for said drawing operation object image simultaneously from another terminal unit, said image processing program also executes the image manipulation process based on the drawing operation, said drawing operation echo back script periodically issues the XMLHTTP request with a timer drive, said image processing program returns the information of one or more rectangular areas including the area where the image contents are modified, which are computed by said image processing program, or the information required when the drawing operation echo back script computes said rectangular areas in said drawing operation echo back script, as a response to said XMLHTTP request, in response to the image manipulation process based on the drawing operation from said another terminal unit, said drawing operation echo back script transmits one or more HTTP requests for selectively requesting the images in one or more rectangular areas according to the information received and acquired from said server, or one or more rectangular areas according to the information computed by itself and acquired based on the information received from said server to said server, said server receives said HTTP requests, and returns selectively the image data in the corresponding one or more rectangular areas of the image displayed on the screen of said WEB browser, and said WEB browser displays the images of the received image data of one or more rectangular areas in the corresponding rectangular areas on the screen of said WEB browser, instead of the images being displayed so far in said rectangular areas.

25. The image display updating method according to claim 16, wherein the drawing operation object image held and managed by said server is composed of a single image file corresponding to the entire image, or a plurality of image files corresponding to a plurality of sliced images in which said entire image is actually divided into rectangles, and said rectangular area is the area of the virtual split image unit in which the image in one image file is virtually divided into plural rectangles.

26. The image display updating method according to claim 16, wherein the drawing operation object image held and managed by said server is composed of image files of a plurality of sliced images in which said entire image is actually divided into plural rectangles, and, said rectangular area accords with the area of the sliced-image unit.

27. The image display updating method according to claim 16, wherein the drawing operation echo back script of said terminal unit transmits, for each XMLHTTP request, the information on a plurality of coordinate positions of said cursor position along a movement locus of the cursor with said drawing operation to said server, acquires the information of one or more rectangular areas including the area where the image contents are modified through the entire image manipulation process based on said plurality of coordinate positions, and transmits one or more HTTP requests for selectively requesting the images in said one or more rectangular areas to said server, when said drawing operation is operated on the screen where said image is displayed.

28. A drawing operation echo back script that is a program for enabling said terminal unit to execute a process on said terminal unit for implementing the image display updating method according to claim 16, wherein said program is transmitted from said server and appended to said WEB browser on said terminal unit.

29. The image display updating method according to claim 16, wherein the WEB browser comprises software for perusing a WEB page, and said software issues the request corresponding to the HTTP request and the request corresponding to the XMLHTTP request wherein said HTTP request or said XMLHTTP request is issued under the name HTTP request or the name XMLHTTP request or a different name.

* * * * *